(12) United States Patent
Cecconello et al.

(10) Patent No.: US 11,105,945 B2
(45) Date of Patent: Aug. 31, 2021

(54) PROCESSES AND SYSTEMS THAT ATTENUATE SOURCE SIGNATURES AND FREE-SURFACE EFFECTS IN RECORDED SEISMIC DATA

(71) Applicant: PGS Geophysical AS, Oslo (NO)

(72) Inventors: Elsa Cecconello, Oslo (NO); Endrias Asgedom, Oslo (NO); Walter Söllner, Oslo (NO)

(73) Assignee: PGS Geophysical AS, Oslo (NO)

( * ) Notice: Subject to any disclaimer, the term of this patent is extended or adjusted under 35 U.S.C. 154(b) by 373 days.

(21) Appl. No.: 16/278,888

(22) Filed: Feb. 19, 2019

(65) Prior Publication Data

US 2019/0257966 A1    Aug. 22, 2019

Related U.S. Application Data

(60) Provisional application No. 62/633,279, filed on Feb. 21, 2018.

(51) Int. Cl.
*G01V 1/36* (2006.01)
*G01V 1/30* (2006.01)

(52) U.S. Cl.
CPC ............. *G01V 1/366* (2013.01); *G01V 1/301* (2013.01)

(58) Field of Classification Search
CPC .......... G01V 1/366; G01V 1/301; G01V 1/28; G01V 1/3808; G01V 2210/56; G01V 2210/1214
See application file for complete search history.

(56) References Cited

U.S. PATENT DOCUMENTS

| 8,456,950 | B2* | 6/2013 | Hegna | G01V 1/364 367/24 |
| 8,902,699 | B2* | 12/2014 | Sollner | G01V 1/325 367/22 |
| 10,345,469 | B2* | 7/2019 | Poole | G01V 1/301 |
| 10,578,756 | B2* | 3/2020 | Asgedom | G01V 1/38 |
| 10,775,524 | B2* | 9/2020 | Sun | G01V 1/36 |
| 2010/0091610 | A1* | 4/2010 | Sollner | G01V 1/38 367/24 |
| 2010/0274492 | A1* | 10/2010 | Rentsch | G01V 1/3808 702/14 |
| 2014/0016436 | A1* | 1/2014 | Sollner | G01V 1/364 367/24 |

(Continued)

*Primary Examiner* — Daniel Pihulic

(57) ABSTRACT

Processes and systems for deblending blended seismic data with attenuated source signatures and free-surface effects are described. The blended seismic data may have been recorded in a marine survey in which multiple sources are activated in the body of water above a subterranean formation. Receivers record overlapping pressure and vertical velocity wavefield responses from the subterranean formation as corresponding blended pressure wavefield and blended vertical velocity wavefield. Processes and systems compute an upgoing pressure wavefield and a downgoing vertical velocity wavefield based on the blended pressure wavefield and blended vertical velocity wavefield. Deblended primary pressure wavefields are computed based on the upgoing pressure and downgoing vertical velocity. The deblended primary pressure wavefields may be used to generate images of the subterranean formation that are substantially free of source signatures and free-surface effects.

19 Claims, 20 Drawing Sheets

(56) References Cited

U.S. PATENT DOCUMENTS

| | | | |
|---|---|---|---|
| 2016/0061977 A1* | 3/2016 | Turnbull | G01V 1/36 |
| | | | 702/17 |
| 2017/0234998 A1* | 8/2017 | Asgedom | G01V 1/38 |
| | | | 702/14 |
| 2019/0257966 A1* | 8/2019 | Cecconello | G01V 1/366 |
| 2021/0063593 A1* | 3/2021 | Asgedom | G01V 1/325 |

* cited by examiner

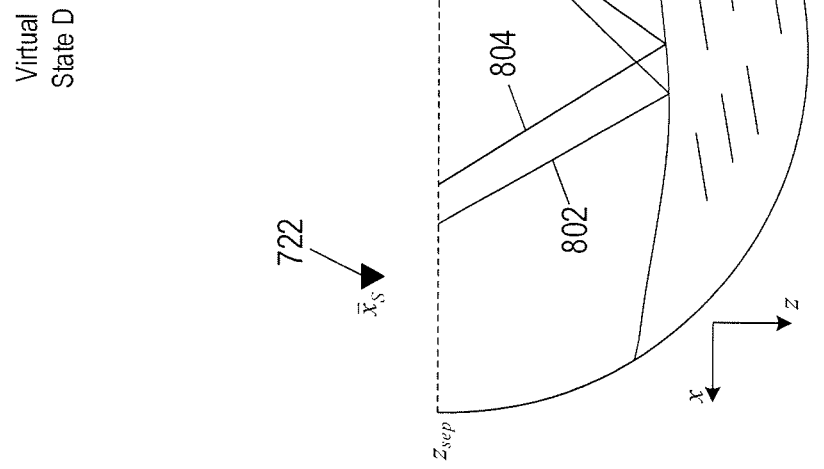
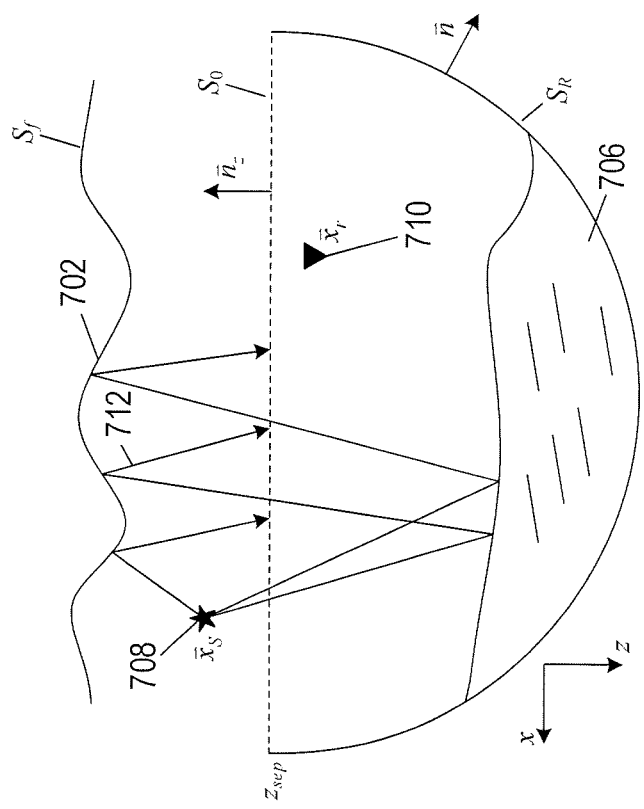
FIG. 8B
FIG. 8A

PROCESSES AND SYSTEMS THAT ATTENUATE SOURCE SIGNATURES AND FREE-SURFACE EFFECTS IN RECORDED SEISMIC DATA

CROSS-REFERENCE TO A RELATED APPLICATION

This application claims the benefit of Provisional Application 62/633,279, filed Feb. 21, 2018, which application is hereby incorporated by reference entirely as if fully set forth herein.

BACKGROUND

Marine seismology companies invest heavily in the development of marine seismic surveying equipment and seismic data processing techniques in order to obtain accurate, high-resolution images of subterranean formations located beneath a body of water. High-resolution images of a subterranean formation are used to determine the structure of subterranean formations, discover petroleum reservoirs, and monitor petroleum reservoirs during production. A typical marine seismic survey is carried out with one or more survey vessels that tow a seismic source and many streamers through the body of water. The survey vessel contains seismic acquisition equipment, such as navigation control, seismic source control, seismic receiver control, and recording equipment. The seismic source control controls activation of the one or more seismic sources at selected times or locations. The seismic source can be an impulsive source, such as an array of air guns, that are activated to produce acoustic energy with an impulsive signature. The seismic source can be a marine vibrator that emits acoustic energy with a substantially constant signature over a much longer time period. The acoustic energy generated by a seismic source spreads out in all directions. A portion of the acoustic energy travels down through the water and into a subterranean formation to propagate as sound waves within the subterranean formation. At each interface between different types of liquid, rock and sediment, a portion of the sound wave is refracted, a portion is transmitted, and another portion is reflected into the body of water to propagate as a reflected wavefield toward the water surface. The streamers are elongated spaced apart cable-like structures towed behind a survey vessel in the direction the survey vessel is traveling and are typically arranged substantially parallel to one another. Each streamer contains numerous seismic receivers or sensors that detect pressure and/or particle motion wavefields of the sound waves. The streamers collectively form a seismic data acquisition surface that records wavefields as seismic data in the recording equipment. Alternatively, the data acquisition surface may comprise hydrophones and motion sensors at fixed locations along the seafloor. The recorded pressure and/or particle motion wavefields are processed to generate images of the subterranean formation.

DESCRIPTION OF THE DRAWINGS

FIG. 8A shows the physical state in FIG. 7A with ray paths of upgoing wavefields removed.

FIG. 8B shows an example of source-receiver reciprocity applied to the virtual state of FIG. 7B.

DETAILED DESCRIPTION

Figure 1A:
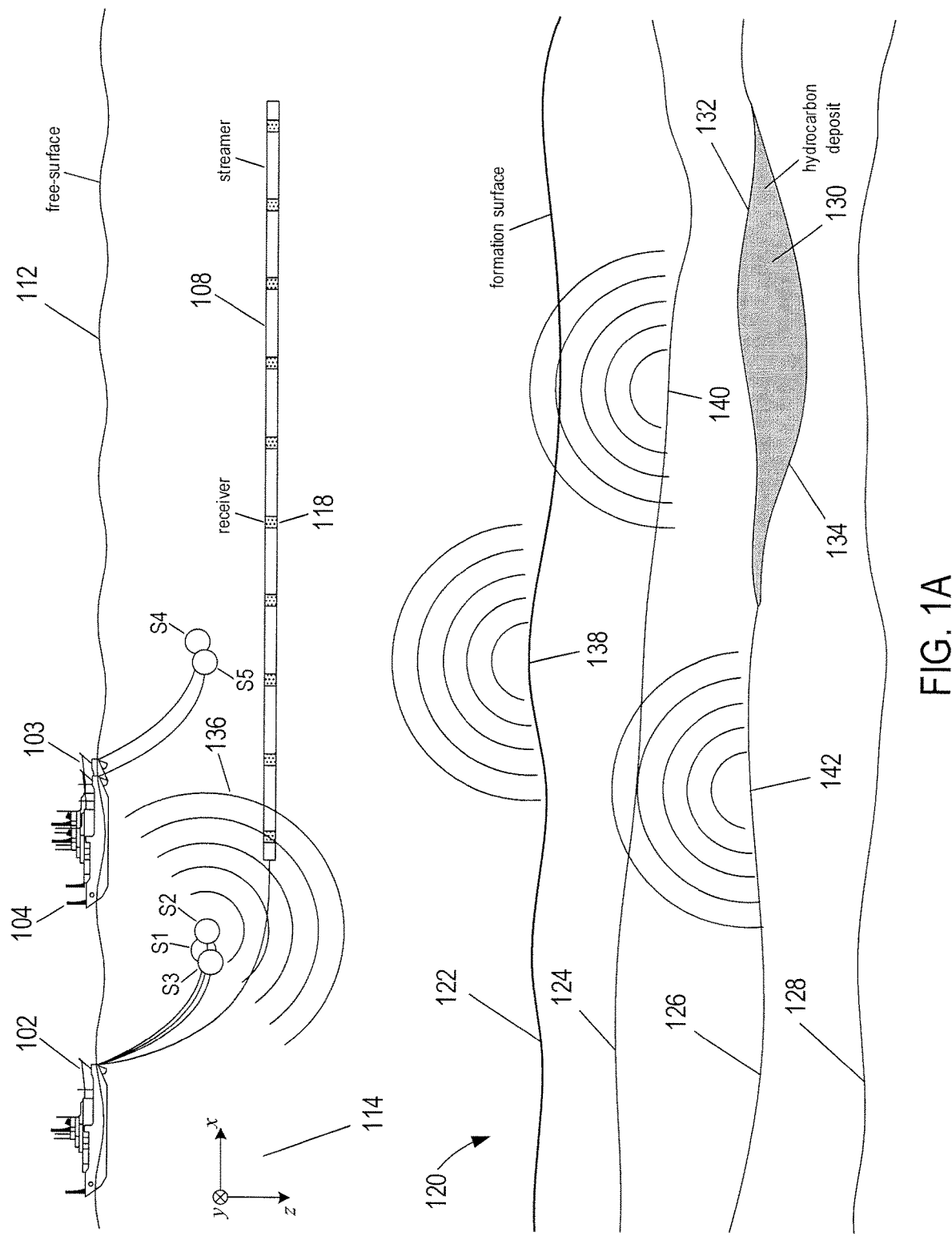
FIGS. 1A-1B show side-elevation and top views of an example seismic data acquisition system.

Images of a subterranean formation are ideally generated from seismic data that contains only primary reflection wavefields, also called "primaries," which are reflected wavefields that travel directly from the subterranean formation upward to the receivers. However, the recorded seismic data may also contain a record of undesirable wavefields, such as a source wavefield that travels directly to the receivers, called a "source signature," a source wavefield reflected downward from the free surface before reaching the receivers, called a "source ghost," and time delayed copies of the reflected wavefield created by multiple reflections between the free surface and the subterranean formation called "multiple wavefields" or simply "multiples." The undesirable wavefields are typically regarded as noise, because source signatures and source ghosts contain no information about the subterranean formation and multiples create overlapping ghost images within the images of the subterranean formation, making identification of subsurface features, structures, and hydrocarbon deposits within the subterranean formation more difficult. Techniques for processing seismic data into images of a subterranean formation include processes for removing source signatures and separately removing source ghosts and multiples from the recorded seismic data based on a flat acoustic reflector approximation of the free surface, leaving the primaries in the seismic data to generate images of the subterranean formation. In other words, these techniques for processing seismic data into images of a subterranean formation assume that recorded seismic data was collected in calm water conditions in which the free surface had relatively small wave heights (e.g., wave heights less than about half a meter).

Typical techniques are inadequate, however, for processing seismic data into an image of a subterranean formation where the seismic data was recorded in rough water conditions. In rough water conditions (e.g., wave heights greater than about half a meter), the rough, time-varying free surface waves located above the streamers create time varying perturbations in the arrival times of the source ghosts and multiples at the receivers. As a result, images of a subterranean formation generated from seismic data recorded in less than ideal water conditions based on conventional seismic data processing techniques that assume calm water conditions do not accurately represent the depths and shapes of structural features of the subterranean formation.

Processes and systems described herein are directed to deblending blended seismic data recorded using simultaneous source acquisition ("SSA"), and to attenuating source signatures and free-surface effects in the deblended seismic data recorded in ideal or rough water conditions. Free-surface effects are source ghosts and multiples that include reflections from the free surface. In SSA, source wavefields are created by activating multiple sources in the body of water closely enough in time with one another that numerous overlapping reflected wavefields are recorded together in the same traces. SSA techniques have been developed to reduce the time for acquiring seismic data, to increase acoustic illumination of the subterranean formation, and to increase diversity of the seismic data in terms of fold, azimuth, and offsets relative to marine seismic techniques that do not employ SSA. The overlapping reflected wavefields in SSA surveys are recorded by the receivers as blended seismic data that contains source signatures, source ghosts, and multiples created by activating the multiple sources. Blended seismic data may be recorded while the multiple sources are activated at random or according to a predetermined activation sequence. For example, source activations may be separated in time by regular time intervals or random time intervals. Processes and systems described herein may be used to produce deblended seismic data with attenuated source signatures and free-surface effects, where the blended seismic data was recorded during a marine survey carried out in calm or rough water conditions. The deblended seismic data with attenuated source signatures and free-surface effects may be further processed to generate high-resolution images of a subterranean formation.

Marine Seismic Surveying Using Multiple Sources

Figure 1B:
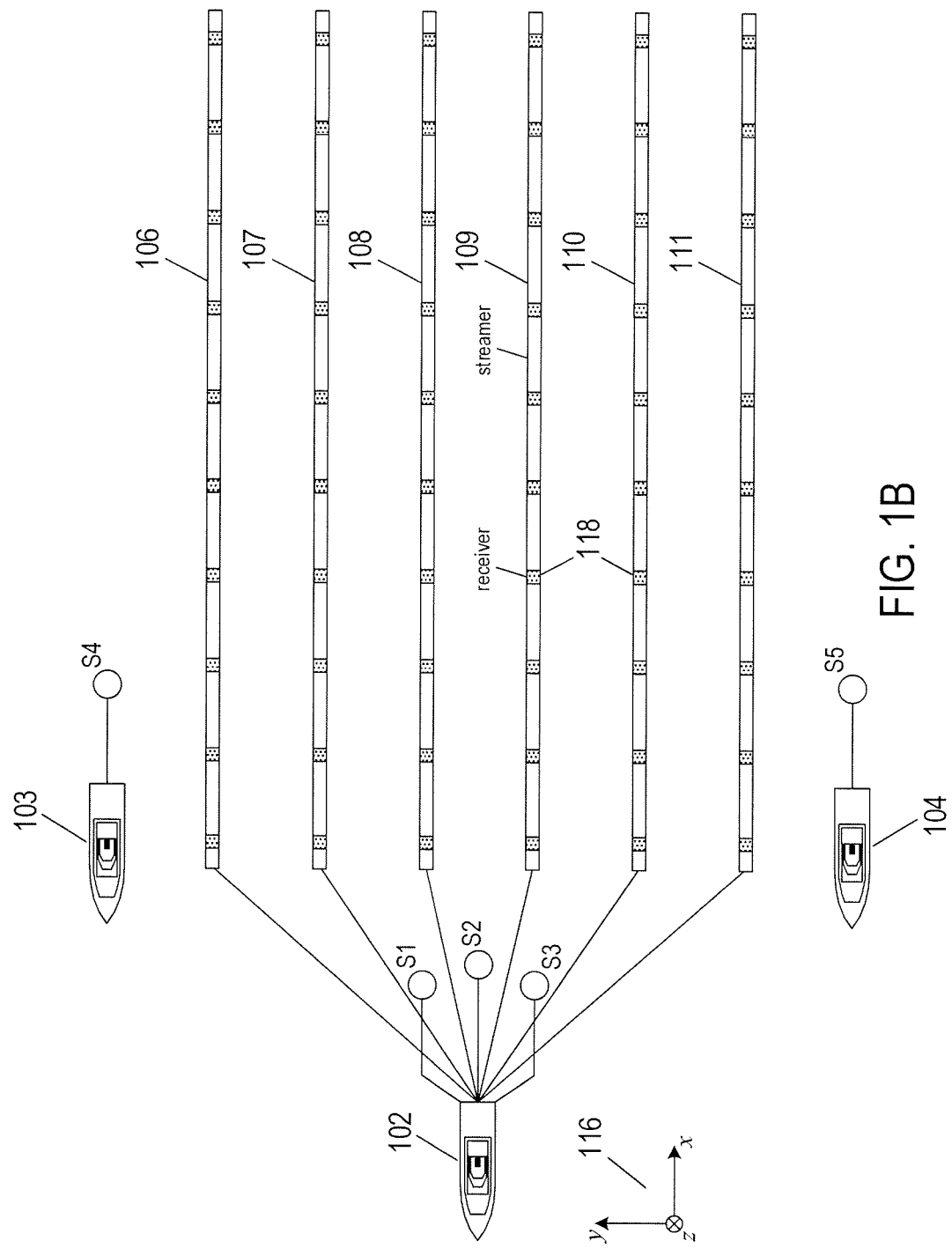

FIGS. 1A-1B show a side-elevation view and a top view, respectively, of an example marine seismic data acquisition system composed of three exploration seismology survey vessels 102-104 and five sources denoted by S1, S2, S3, S4, and S5. As illustrated, survey vessel 102 tows sources S1, S2, and S3, survey vessel 103 tows source S4, and survey vessel 104 tows source S5. A seismic data acquisition system is not limited to five sources as shown in FIGS. 1A-1B. In practice, the number of sources can range from as few as two sources to as many as six or more sources. The body of water can be, for example, an ocean, a sea, a lake, a river, or any portion thereof. In this example, the survey vessel 102 tows six streamers 106-111 below the free surface of a body of water. Each streamer is attached at one end to the survey vessel 102 via a streamer-data-transmission cable. The illustrated streamers 106-111 form an ideally planar horizontal seismic data acquisition surface of the marine seismic data acquisition system with respect to the free surface 112. However, in practice, the streamers may be smoothly varying due to active sea currents and weather conditions. In other words, although the streamers 106-111 are illustrated in FIGS. 1A and 1B to form a planar data acquisition surface, in practice, the towed streamers may undulate because of dynamic conditions of the body of water in which the streamers are submerged. A data acquisition surface is not limited to a planar horizontal orientation with respect to the free surface 112. The data acquisition surface may be angled with respect to the free surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers.

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers or in the direction the survey vessel is traveling and is referred to as the "in-line" direction. The y-direction specifies the position of a point in a direction perpendicular to the x-axis and substantially parallel to the free surface 112 and is referred to as the "cross-line" direction. The z-direction, also referred to as the "depth" direction, specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart apart along the length of each streamer to seismic data acquisition equipment and data-storage devices located onboard the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and/or position of the streamers as the streamers are towed through the body of water. The depth-measuring devices are typically placed at intervals (e.g., about 300-meter intervals in some implementations) along each streamer. Note that in other implementations buoys may be attached to the streamers and used to maintain the orientation and depth of the streamers below the free surface 112.

FIG. 1A shows a side-elevation view of the survey vessels 102-104 towing sources S1-S5 above a subterranean formation 120. Each of the sources S1-S5 comprises multiple sources elements, such as water guns or air guns, suspended from floats below the free surface. The air guns and water guns can be selected with different chamber volumes and arranged in a particular manner within the source to generate an acoustic impulse. For example, each source may comprise an array of source elements that are activated to produce an acoustic signal with an impulse (i.e., spike) source signature. Alternatively, one or more of the sources S1-S5 may be a marine vibrator that when activated produces an acoustic signal with a substantially continuous source signature. Curve 122, the formation surface, represents a top surface of the subterranean formation 120 located at the bottom of the body of water. The subterranean formation 120 may include many subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the sources S1-S5 are activated (i.e., fired or shot) to produce corresponding acoustic signals. For the sake of simplicity, FIG. 1A shows a single acoustic signal expanding outward from the source S2 as a pressure wavefield 136 represented by semicircles of increasing radius centered at the source S2. The outwardly expanding wavefronts from the source may be spherical but are shown in vertical plane cross section in FIG. 1A. The outward and downward expanding portion of the pressure wavefield 136 is called the "source wavefield," and any portion of the pressure wavefield 136 reflected downward from the free-surface 112 is called the "ghost source wavefield." The source and ghost source wavefields eventually reach the formation surface 122 of the subterranean formation 120, at which point the wavefields may be partially reflected from the formation surface 122 and partially refracted downward into the subterranean formation 120, becoming elastic waves within the subterranean formation 120. In other words, in the body of water, the acoustic signal primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signals generated by the sources S1-S5. As shown in FIG. 1A, waves of significant amplitude may be generally reflected from points on or close to the formation surface 122, such as point 138, and from points on or very close to interfaces in the subterranean formation 120, such as points 140 and 142.

The waves that compose the reflected wavefield may be generally reflected at different times within a range of times following the source wavefield. A point on the formation surface 122, such as the point 138, may receive a pressure disturbance from the source wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which waves are reflected from various points within the subterranean formation 120 may be related to the distance, in three-dimensional space, of the points from the activated source 104.

Acoustic and elastic waves may travel at different velocities within different materials as well as within the same material under different pressures. Therefore, the travel times of the source wavefield and reflected wavefield may be functions of distance from the source as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Figure 2:
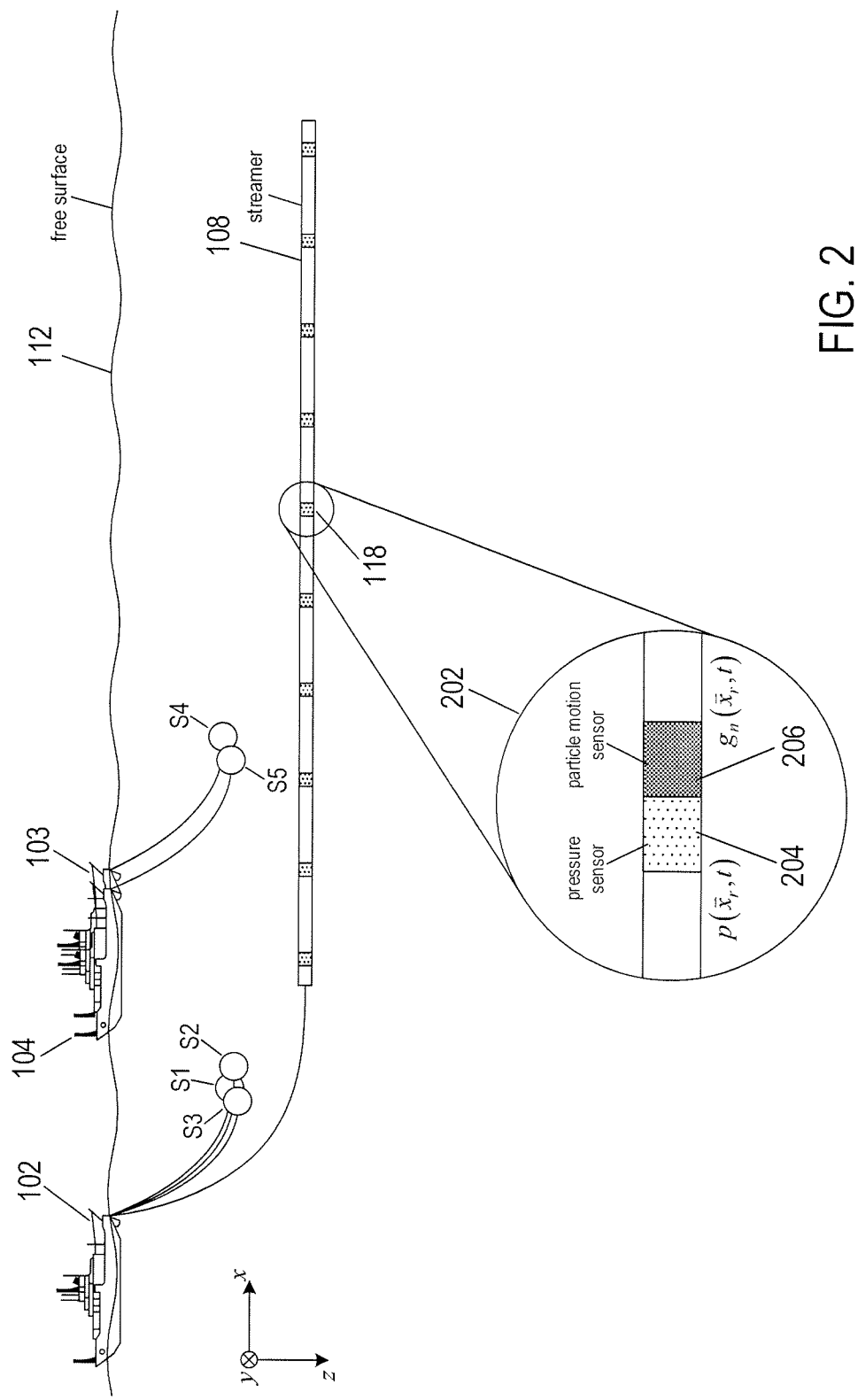
FIG. 2 shows a side-elevation view of a seismic data acquisition system with a magnified view of a receiver.

Each receiver 118 may be a multicomponent sensor including particle motion sensors and a pressure sensor. A pressure sensor detects variations in water pressure over time. The term "particle motion sensor" is a general term used to refer to a sensor that may be configured to detect particle displacement, particle velocity, or particle acceleration over time. FIG. 2 shows a side-elevation view of the marine seismic data acquisition system with a magnified view 202 of the receiver 118. In this example, the magnified view 202 reveals that the receiver 118 is a multicomponent sensor comprising a pressure sensor 204 and a particle motion sensor 206. The pressure sensor may be, for example, a hydrophone. Each pressure sensor is a non-directional sensor that measures changes in a hydrostatic pressure wavefield over time to produce pressure wavefield data denoted by $p(\vec{x}_r, t)$, where $\vec{x}_r$ represents the Cartesian coordinates $(x_r, y_r, z_r)$ of a receiver, and t represents time. Pressure wavefield data may also be called the "pressure wavefield." The particle motion sensors are directional sensors that are responsive to water motion in a particular direction. In general, particle motion sensors detect particle motion (i.e., displacement, velocity, or acceleration) in a direction and may be responsive to such directional displacement of the particles, velocity of the particles, or acceleration of the particles. A particle motion sensor that measures particle displacement generates particle displacement data denoted by $g_{\vec{n}}(\vec{x}_r, t)$, where the vector $\vec{n}$ represents the direction along which particle displacement is measured. A particle motion sensor that measures particle velocity (i.e., particle velocity sensor) generates particle velocity wavefield data denoted by $v_{\vec{n}}(\vec{x}_r, t)$. A particle motion sensor that measures particle acceleration (i.e., accelerometer) generates particle acceleration data denoted by $a_{\vec{n}}(\vec{x}_r, t)$. The data generated by one type of particle motion sensor may be converted to another type. For example, particle displacement data may be differentiated to obtain particle velocity wavefield data, and particle acceleration data may be integrated to obtain particle velocity wavefield data.

The term "particle motion data" is a general term used to refer to particle displacement data, particle velocity wavefield data, or particle acceleration data. The term "seismic data" refers to pressure wavefield data and/or particle motion data. Particle displacement data represents a particle displacement wavefield, particle velocity wavefield data represents a particle velocity wavefield, and particle acceleration data represents a particle acceleration wavefield. The particle displacement, velocity, and acceleration wavefield data are referred to as particle displacement, velocity, and acceleration wavefields.

The particle motion sensors are typically oriented so that the particle motion is measured in the vertical direction (i.e., $\vec{n} = (0, 0, z)$) in which case $g_z(\vec{x}_r, t)$ is called the "vertical displacement wavefield," $v_z(\vec{x}_r, t)$ is called the "vertical velocity wavefield," and $a_z(\vec{x}_r, t)$ is called the "vertical acceleration wavefield." Alternatively, each receiver may include two additional particle motion sensors that measure particle motion in two other directions, $\vec{n}_1$ and $\vec{n}_2$, that are orthogonal to $\vec{n}$ (i.e., $\vec{n} \cdot \vec{n}_1 = \vec{n} \cdot \vec{n}_2 = 0$, where "·" is the scalar product) and orthogonal to one another (i.e., $\vec{n}_1 \cdot \vec{n}_2 = 0$). In other words, each receiver may include three particle motion sensors that measure particle motion in three orthogonal directions. For example, in addition to having a particle motion sensor that measures particle velocity in the z-direction to give $v_z(\vec{x}_r, t)$, each receiver may include a particle motion sensor that measures the wavefield in the in-line direction in order to obtain the in-line velocity wavefield, $v_x(\vec{x}_r, t)$, and a particle motion sensor that measures the wavefield in the cross-line direction in order to obtain the cross-line velocity wavefield, $v_y(\vec{x}_r, t)$. In certain implementations, the receivers may be only pressure sensors, and in other implementations, the receivers may be only particle motion sensors. The three orthogonal velocity wavefield sets form a velocity wavefield vector $\vec{v} = (v_x, v_y, v_z)$.

The streamers 106-111 and the survey vessel 102 may include sensing electronics and data-processing facilities that allow seismic data generated by each receiver to be correlated with the time each source is activated, absolute positions on the free surface 112, and absolute three-dimensional positions with respect to an arbitrary three-dimensional coordinate system. The pressure wavefield and particle motion data may be stored at the receiver, and/or may be sent along the streamers and data transmission cables to the survey vessel 102, where the data may be stored electronically, magnetically or optically on data-storage devices located onboard the survey vessel 102 and/or transmitted onshore to data-storage devices located in a seismic data-processing facility.

Each pressure sensor and particle motion sensor may include an analog-to-digital converter that converts time-dependent analog signals into discrete time series that consist of numerous consecutively measured values called "amplitudes" separated in time by a sample rate. The time series data generated by a pressure or particle motion sensor is called a "trace," which may consist of thousands of samples collected at a typical sample rate of about 1 to 5 samples per millisecond. A trace is a recording of a subterranean formation response to acoustic energy that passes from an activated source, into the subterranean formation where a portion of the acoustic energy is reflected and/or refracted, and ultimately detected by a sensor as described above. Each trace records variations in time-dependent amplitudes that correspond to fluctuations in acoustic energy of the wavefield measured by the sensor. In general, each trace is an ordered set of discrete spatial and time-dependent pressure or motion sensor amplitudes denoted by:

$$tr(\vec{x}_r, t) = \{A(\vec{x}_r, t_j)\}_{j=0}^{J-1} \quad (1)$$

where
tr represents pressure, particle displacement, particle velocity, or particle acceleration amplitude;
A represents amplitude;
$t_j$ is the j-th sample time; and
J is the number of time samples in the trace.

The coordinate location $\vec{x}_r$ of each receiver may be calculated from global position information obtained from one or more global positioning devices located along the streamers and/or the towing vessel, from depth measuring devices such as hydrostatic pressure sensors, and from the known geometry and arrangement of the streamers and receivers. The receiver location varies with time and is also denoted by $\vec{x}_r(t)$ (i.e., $\vec{x}_r = \vec{x}_r(t) = (x_r(t), y_r(t), z_r(t))$). Each trace also includes a trace header not represented in Equation (1) that identifies the specific receiver that generated the trace, receiver and source GPS spatial coordinates, receiver depth, and may include time sample rate and the number of time samples.

The reflected wavefield from the subterranean formation typically arrives first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques to obtain information about the structure of the subterranean formation. The traces may be sorted into different domains, such as a common-shot domain, common-receiver domain, common-receiver-station domain, and common-midpoint domain. For example, a collection of traces sorted into the common-shot domain are called a common-shot gather and a collection of traces sorted into common-receiver domain are called a common-receiver gather. The portion of the acoustic signal that is reflected into the body of water from the subterranean formation and travels directly to the receivers is called a primary reflected wavefield or simply a "primary." Other portions of the acoustic energy that are reflected upward into the body of water and that reverberate between the free surface and the subterranean formation before reaching the receivers are called free-surface multiple reflected wavefields or simply "free-surface multiples." Other portions of the acoustic energy that are reflected upward into the body of water directly to receivers after having reverberated within the subterranean formation are called subsurface multiple reflections or simply "subsurface multiples."

Figure 3A:
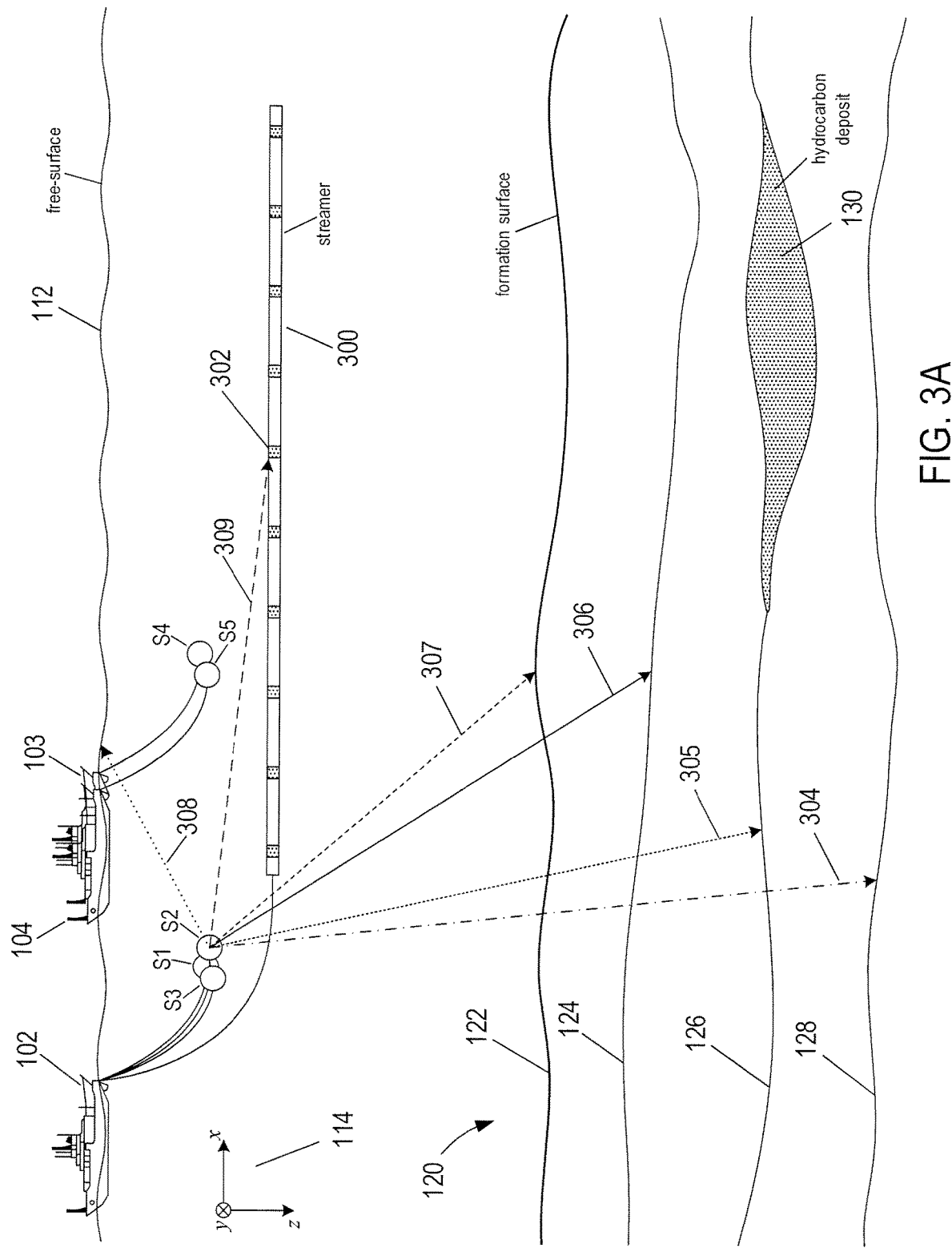
FIGS. 3A-3C show a snapshot of a streamer and different ways in which acoustic energy emitted from a source reverberates between a free surface and a subterranean formation before reaching a receiver.
Figure 3B:
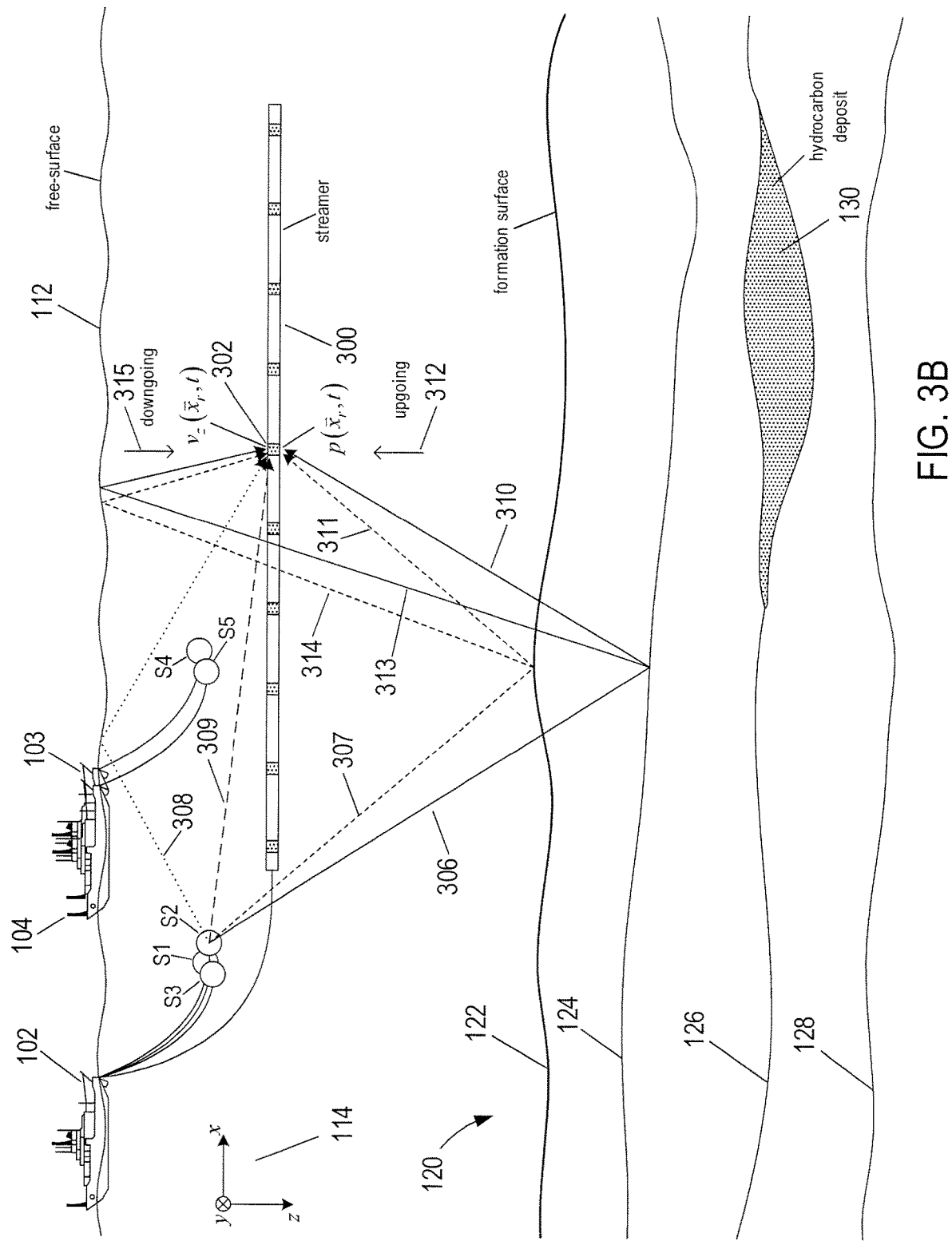
Figure 3C:
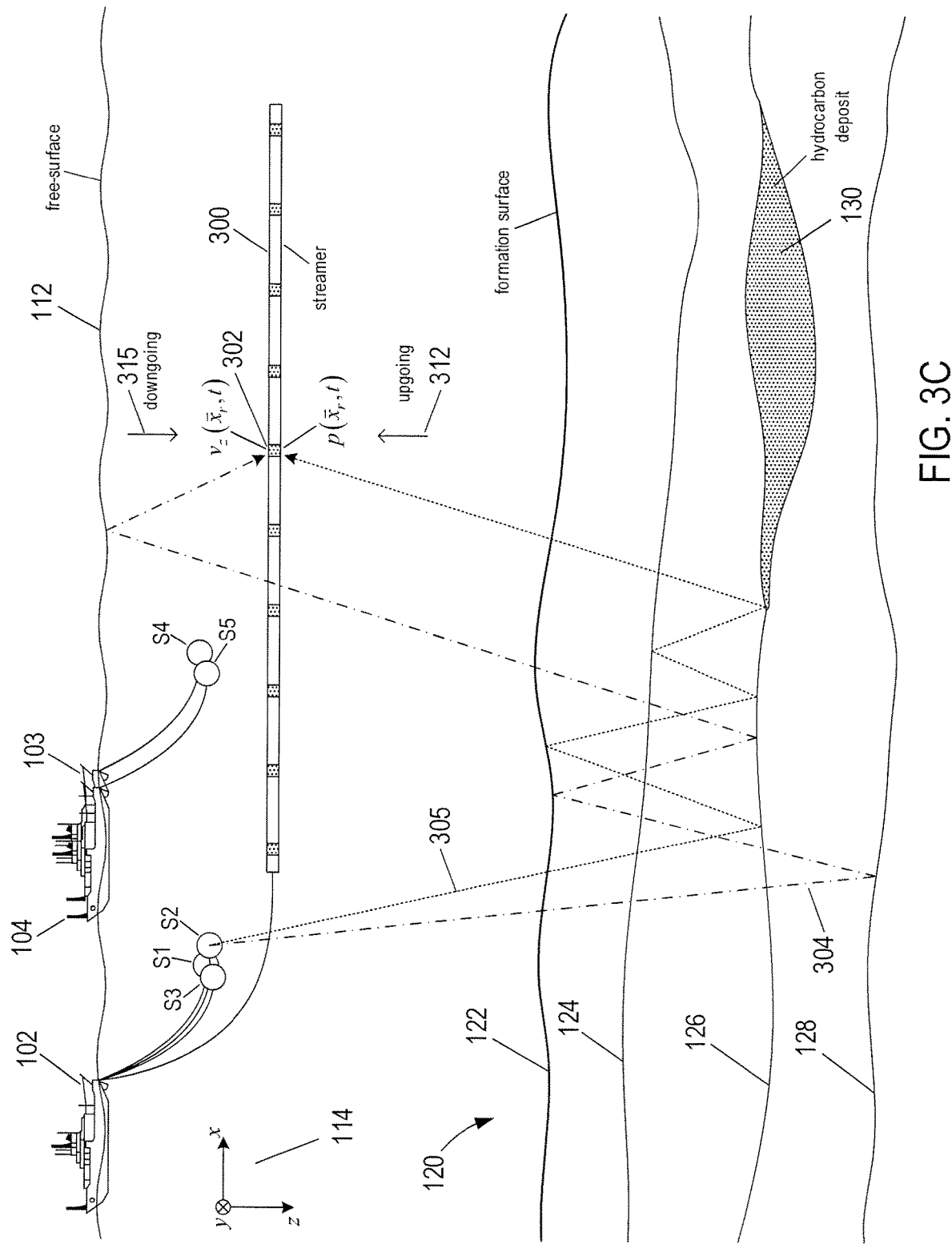

FIGS. 3A-3C show a snapshot of a streamer 300 and different ways in which acoustic energy emitted from the source S2 reverberates between the free surface 112 and the subterranean formation 120 before reaching the receiver 302. For the sake of simplicity, FIGS. 3A-3C illustrate only a few of many possible ray paths acoustic energy of an acoustic signal created by the source S2 may travel before reaching the receiver 302. In FIG. 3A, directional arrows 304-309 represent ray paths of different portions of the acoustic signal generated by the source S2. For example, ray paths 304-307 represent portions of the acoustic signal that penetrate to different interfaces of the subterranean formation 102, and ray path 308 represents a portion of the acoustic signal that reaches the free surface 112. Ray path 309 represents the source signature, which is a portion of the acoustic signal that travels directly to the receiver 302. In FIG. 3B, ray path 308 is extended to present a downward reflection from the free surface 112 (i.e., source ghost). Ray paths 310 and 311 represent reflections from the interface 124 and the formation surface 122 that travel directly to the receiver 302, which are called "upgoing primary reflections" or "primaries," as indicated by upgoing directional arrow 312. Ray paths 313 and 314 represent reflections from the interface 124 and the formation surface 122 followed by downward reflections from the free surface 112 before traveling directly to the receiver 302, which are called "downgoing reflections" as indicated by directional arrow 315. In FIG. 3C, ray paths 304 and 305 are extended to represent multiple reflections between interfaces within the subterranean formation 120 and the free surface 112. Extended ray path 304 represents a downgoing free-surface multiple. Extended ray path 305 represents an upgoing sub-surface multiple. In FIGS. 3B-3C, wavefields that are reflected downward from the free surface 112 before reaching the receivers, as represented by ray paths 313, 314, and 304, are examples of "downgoing wavefields" that may also be called "ghost wavefields." In FIGS. 3B-3C, wavefields that are reflected upward from the subterranean formation 120, before reaching the receivers, as represented by ray paths 310, 311, and 305, are examples of "upgoing wavefields." Seismic data may also include acoustic energy that propagated along interfaces as head waves (not shown) before being reflected upward to the surface 122, and acoustic energy that propagated into layers with velocity gradients that increase with depth due to compression, creating diving waves (not shown) that are gradually turned upward to the surface 122.

Each trace records the source signature, source ghost, primaries, and various types of free surface and subsurface multiples. For example, pressure wavefield $p(\vec{x}_r, t)$ generated at the receiver 302 records hydrostatic pressure changes due to the source signature, source ghost, primaries, and multiples. The vertical velocity wavefield $v_z(\vec{x}_r, t)$ also generated at the receiver 302 records the particle velocity changes due to the direct source wavefield, source ghost, primaries, and multiples. The pressure wavefield $p(\vec{x}_r, t)$ and the vertical velocity wavefield $v_z(\vec{x}_r, t)$ record both upgoing and downgoing pressure and vertical velocity wavefields, respectively, that reach the receiver 302.

Figure 4:
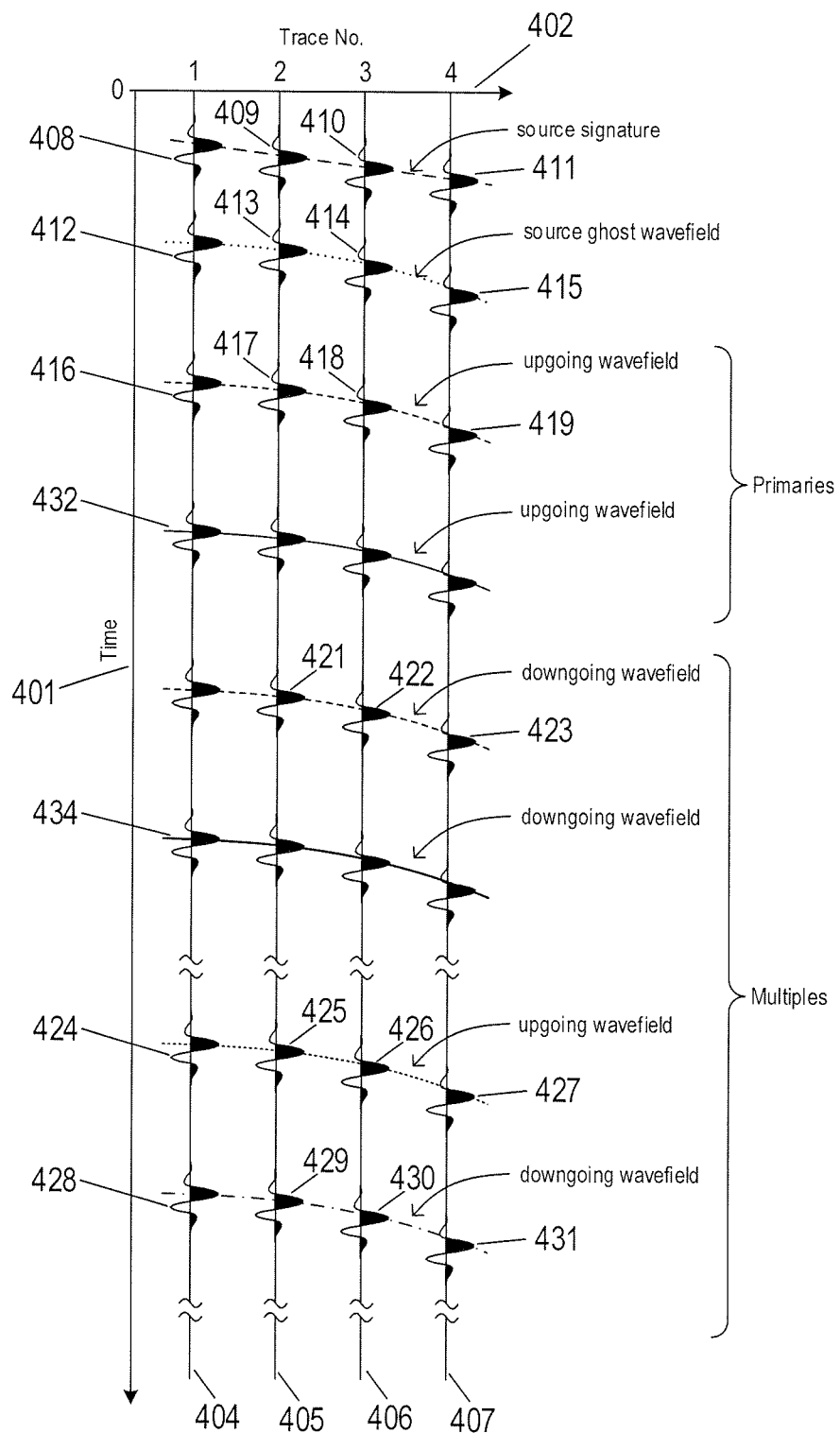
FIG. 4 shows a common-shot gather of reflected wavefields measured by receivers located along a streamer.

FIG. 4 shows an example common-shot gather 400 of four example traces of wavefields measured by four adjacent receivers located along the streamer 300 shown in FIGS. 3A-3C. Vertical axis 401 represents time. Horizontal axis 402 represents trace numbers with trace "1" representing the seismic data generated by a receiver located closer to the source 104 than trace "4" representing the seismic data generated by a receiver located farther away from the source 104. The source S2 is activated at time zero. The distances along the traces 404-407 from time zero to the locations of the wavelets represent travel times of the acoustic energy that is output from the source S2 and that eventually reaches the receivers located along the streamer 302. The traces 404-407 may represent variations in the amplitude of either the pressure wavefield or the particle motion data measured by four adjacent receivers of the streamer 300. The example traces record events, such as an impulse wavefield and a reflected wavefield from a surface or interface, as wavelets located along patterned curves that correspond to the example ray paths that reach the receiver 302 in FIGS. 3A-3C. For example, wavelets 408-411 record the source signature of the source S2 that travels directly to the receivers as represented by dashed ray path 309 in FIG. 3A. Wavelets 412-415 record the source ghost as represented by dotted ray path 308 in FIG. 3B. Wavelets 416-419 record the primary reflected wavefield as represented by dashed-line ray path 311 in FIG. 3B. Wavelets 420-423 record the downgoing reflected wavefield as represented by dashed-line ray path 314 in FIG. 3B. Wavelets 424-427 record the subsurface multiple wavefield as represented by dotted-line ray path 304 in FIG. 3C. Wavelets 428-431 record the free-surface multiple wavefield as represented by dot-dashed-line ray path 305 in FIG. 3C. In FIG. 4, the events are identified as upgoing and downgoing wavefields as represented by the upgoing and downgoing ray paths that reach the receiver 302 in FIGS. 3B and 3C. Wavelets along curves 432 and 434 correspond to upgoing reflection 310 and downgoing reflection 313 in FIG. 3B. Events are also identified as a primaries and multiples.

Traditional marine seismic surveys are carried out by recording reflected wavefields in separate shot records following each activation of a source. The duration of the time interval between any two successive activations of the source is selected so that the acoustic energy of reflected wavefields created by previous activations of the source are small in a shot record created following a subsequent activation of the source. For example, a traditional marine survey may be carried out by activating a source about every 10 seconds. Reflected wavefields are often recorded in shot records for about 8 to 10 seconds immediately following each activation of the source.

With simultaneous source acquisition ("SSA"), multiple sources are activated in a body of water above a subterranean formation. While each source is activated to create a source wavefield, the acoustic energy created by previously activated sources continues to spread out and interact with the subterranean formation, creating overlapping reflected wavefields emanating from the subterranean formation. In SSA, all the sources are not necessarily activated at the same time or in a short time interval (e.g., about one second). The multiple sources may be activated at random or according to a predetermined sequence to create the overlapping reflected wavefields. While the sources are activated, the overlapping reflected wavefields may be continuously recorded as blended seismic data in a single shot record that is stored in one or more data-storage devices.

Figure 5A:
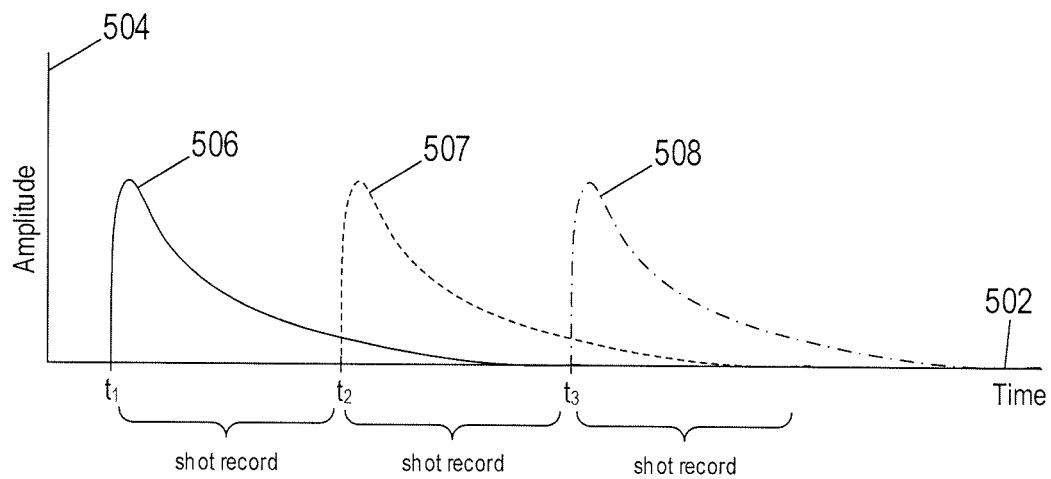
FIG. 5A shows an example plot of acoustic energies of reflected wavefields versus time

FIG. 5A shows an example plot of acoustic energies of reflected wavefields versus time created for three source activations in accordance with traditional marine surveys. Horizontal axis 502 represents time. Vertical axis 504 represents that amplitude range of acoustic energy. Times $t_1$, $t_2$, and $t_3$ along time axis 502 denote source activation times. Patterned curves 506-508 represent acoustic energies of three reflected wavefields emanating from the subterranean formation in response to the three separate acoustic signals created by activating the three sources at the times $t_1$, $t_2$, and $t_3$, respectively. Following each source activation, seismic data is recorded in three separate shot records. Each of the curves exponentially decreases with increasing time, representing attenuation of the acoustic energy of the corresponding reflected wavefields with time. Although acoustic energy created by a previous source activation may be present following a subsequent activation of the source, the activation times are selected so that only the tail or small portion of the acoustic energy created by a previous source activation may be recorded in a subsequent shot record.

Figure 5B:
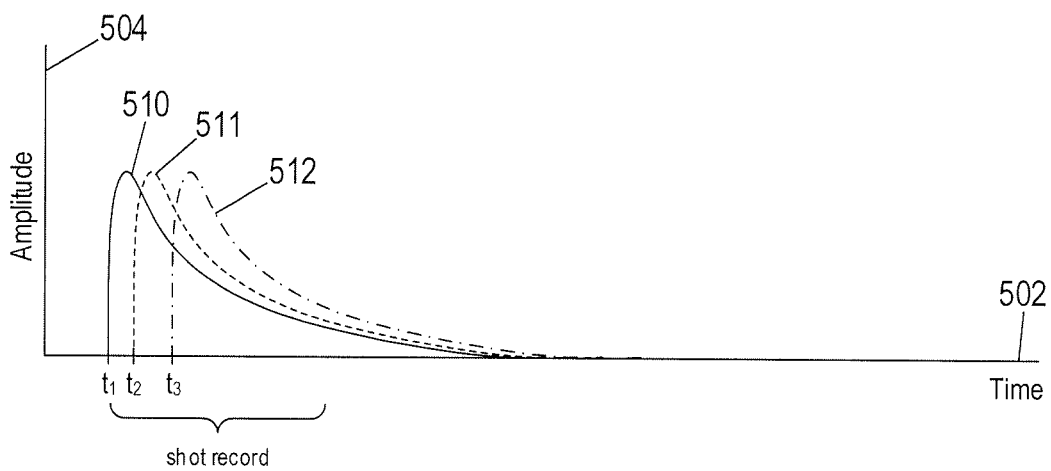
FIGS. 5B-5C show deblending of seismic data obtained from recorded blended seismic data.
Figure 5C:
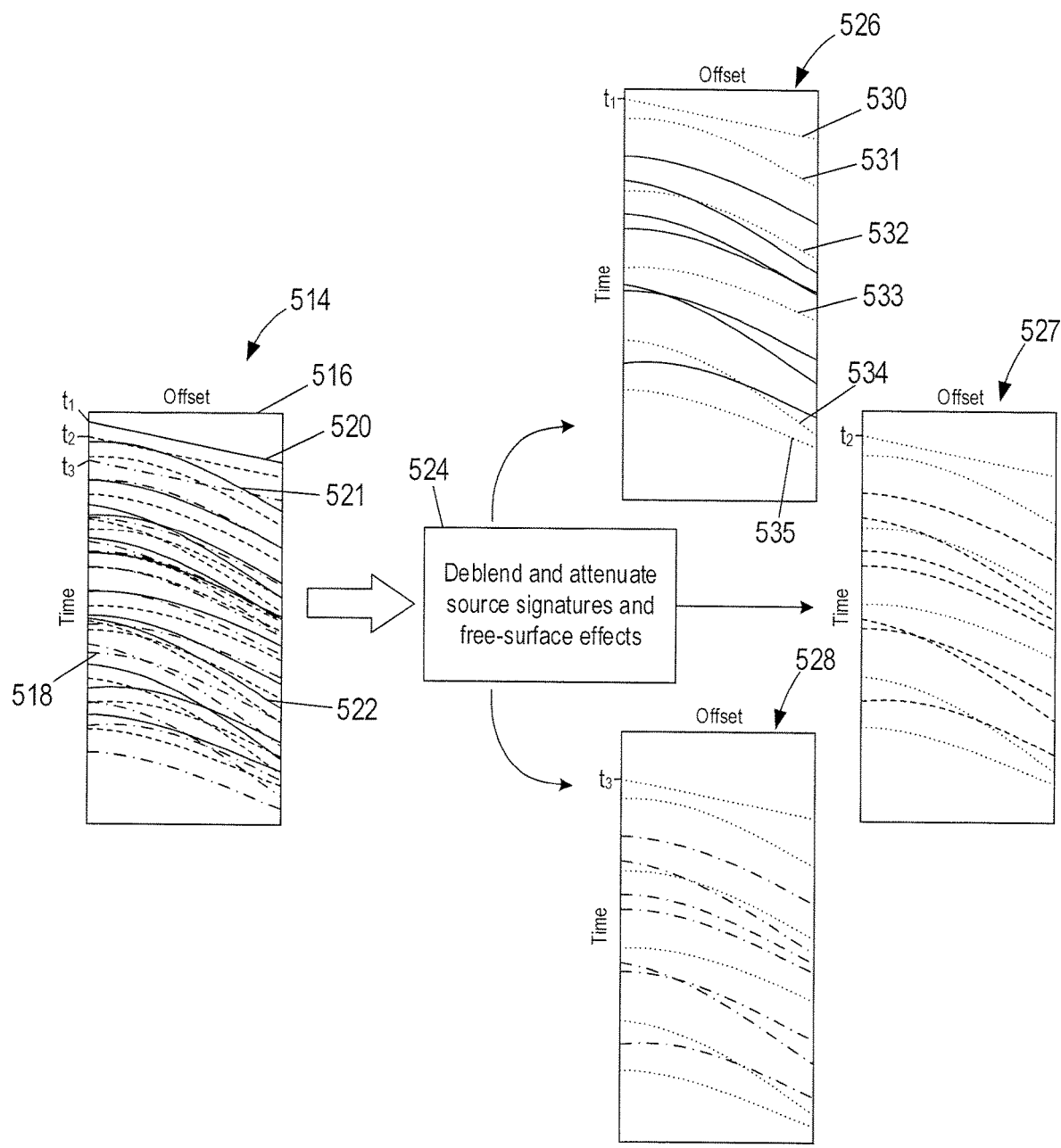

FIG. 5B shows an example plot of acoustic energies of overlapping reflected wavefields versus time for three sources activated using SSA. In the example, times $t_1$, $t_2$, and $t_3$ along time axis 502 denote randomized times when the three sources are activated. Patterned curves 510-512 represent overlapping acoustic energies of three reflected wavefields emanating from the subterranean formation in response to the three separate acoustic signals created by activating the three sources at the times $t_1$, $t_2$, and $t_3$, respectively. Each of the curves exponentially decreases with increasing time, representing attenuation of the acoustic energy of the corresponding reflected wavefields with time. But unlike the acoustic energy created by a source in a traditional survey, in SSA the acoustic energy created by one or more previous source activations may be present as overlapping reflected wavefields having substantial amplitude and recorded as blended seismic data in a shot record. FIG. 5C shows an example of a common-shot gather 514 of recorded blended seismic data obtained from continuously recording overlapping wavefields created by the three sources. Horizontal axis 516 represents source-receiver offset. Vertical axis 518 represents time. Randomized times $t_1$, $t_2$, and $t_3$ located along time axis 518 correspond to randomized times $t_1$, $t_2$, and $t_3$ located along time axis 502 in FIG. 5B. Common-shot gather 514 records source signatures, source ghosts, and reflection events of the three reflected wavefields as represented by differently patterned curves that correspond to acoustic energies plotted in FIG. 5B. For example, solid curves 520-522 represent the source signature, source ghost, and a single reflection event associated with activating one of the three sources at time $t_1$. Dashed curves and dot-dashed curves represent the source signatures, source ghosts, and reflection events associated with activating the other two sources at times $t_2$ and $t_3$, respectively. Block 524 represents the computational process of deblending the common-shot gather 514 and attenuating the source signature and free-surface effects to obtain deblended common-shot gathers 526-528 with attenuated source signatures and free-surface effects (i.e., source ghosts and free-surface multiples). Each of the deblended common-shot gathers 526-528 records primaries and subsurface multiples created by activation of one of the three sources at times $t_1$, $t_2$, and $t_3$, respectively. Attenuated source signatures and free-surface effects are represented by dotted curves in each of the deblended common-shot gathers 526-528. For example, in deblended common-shot gather 526, dotted curves 530 and 531 represent attenuated source signature 520 and source ghost 521 in blended common-shot gather 510, and dotted curves 532-535 represent attenuated free-surface multiples.

Seismic Imaging

Figure 6:
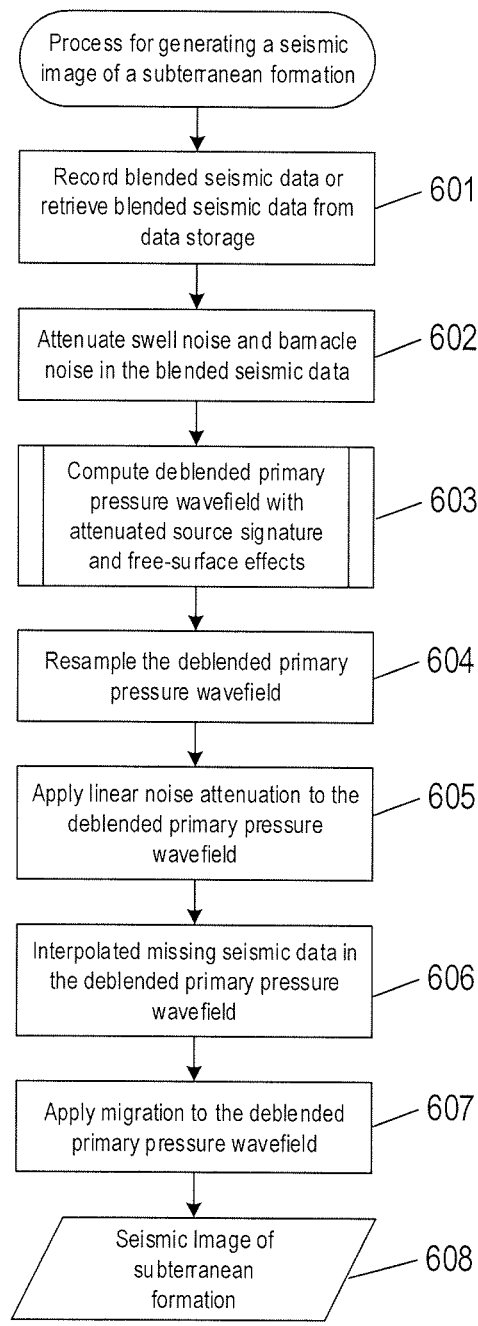
FIG. 6 shows a process for generating an image of a subterranean formation from blended seismic data recorded in a marine seismic survey of the subterranean formation.

FIG. 6 shows a process for generating an image of a subterranean formation from blended seismic data collected in a marine seismic survey of the subterranean formation using SSA. Each block represents a different module of computer implemented machine-readable instructions stored in one or more data-storage devices and executed using one or more processors of a computer system. It should be noted that the series of modules represented in FIG. 6 is not an exhaustive list of the modules used to compute an image of a subterranean formation from recorded seismic data. Processing may include additional modules or certain modules may be omitted or placed in a different ordering, depending on, for example, how the recorded seismic data is collected, conditions under which the recorded seismic data is collected, and depth of the body of water above the subterranean formation.

In FIG. 6, block 601 represents obtaining blended seismic data recorded using SSA, for example in a manner as described above with reference to FIGS. 1A-3. The recorded blended seismic data may be pressure and particle motion data recorded using receivers configured with collocated pressure and particle motion sensors. In block 602, swell noise and barnacle noise in the recorded blended seismic data are attenuated. In block 603, a "compute deblended primary pressure wavefield with attenuated source signature and free-surface effects" procedure is performed to deblend the recorded blended seismic data and to attenuate source signatures and free-surface effects. An example implementation of the "compute deblended primary pressure wavefield with attenuated source signature and free-surface effects" procedure is described below with reference to FIGS. 10-12. In block 604, the gathers of deblended seismic data may be resampled. For example, the traces of a gather of deblended seismic data may be resampled to have the same sampling rate, such as a sample rate of 4 data points per millisecond. In block 605, linear noise in the resampled data may be attenuated by subtracting modeled linear noise from the resampled data. Because the receivers undulate during seismic data recording, the in-line and cross-line receiver locations of the traces may be irregularly spaced during recording of the seismic data. In block 606, interpolation may be applied to replace corrupted traces or fill in traces of missing seismic data, such as interpolating traces in the cross-line direction where receivers are spaced farther apart than desired. For example, in some marine surveys, it may be desirable for crossline receiver spacing not to exceed inline receiver spacing. In block 607, migration is applied to the gathers of deblended seismic data in either the space-time coordinate system (i.e., time migration) or Cartesian coordinate system (i.e., depth migration) to obtain images of the subterranean formation 608 that may be displayed on a monitor.

Figure 10:
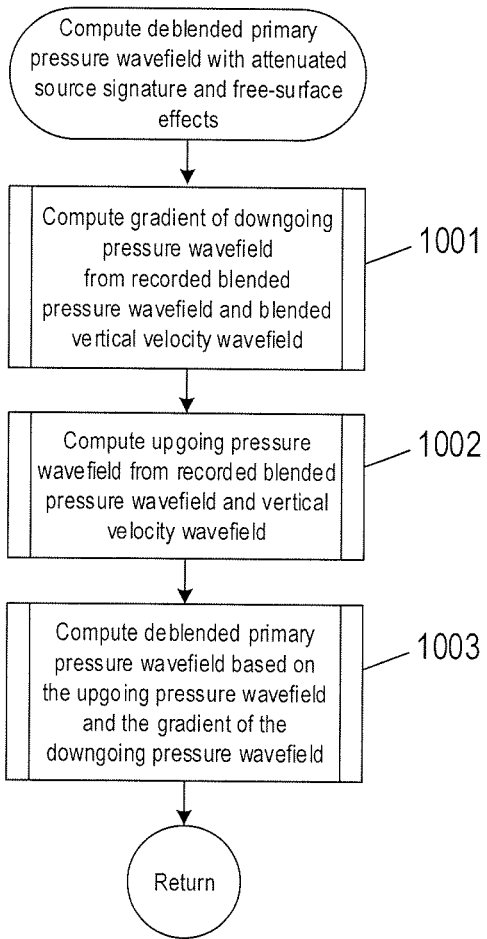
FIG. 10 shows a flow diagram of the routine "compute deblended primary pressure wavefield with attenuated source signature and free-surface effects" called in FIG. 6.
Figure 11:
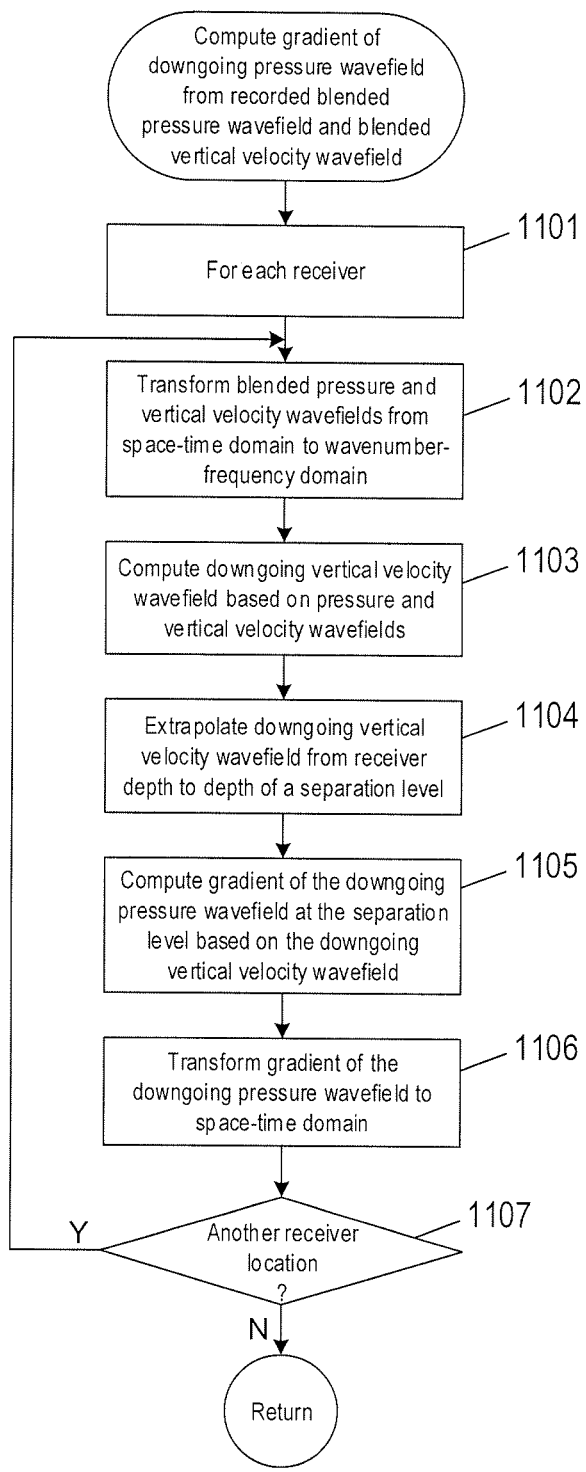
FIG. 11 is a flow diagram illustrating an example implementation of the "compute gradient of downgoing pressure wavefields from recorded blended pressure and vertical velocity seismic data" step referred to in FIG. 10.
Figure 12:
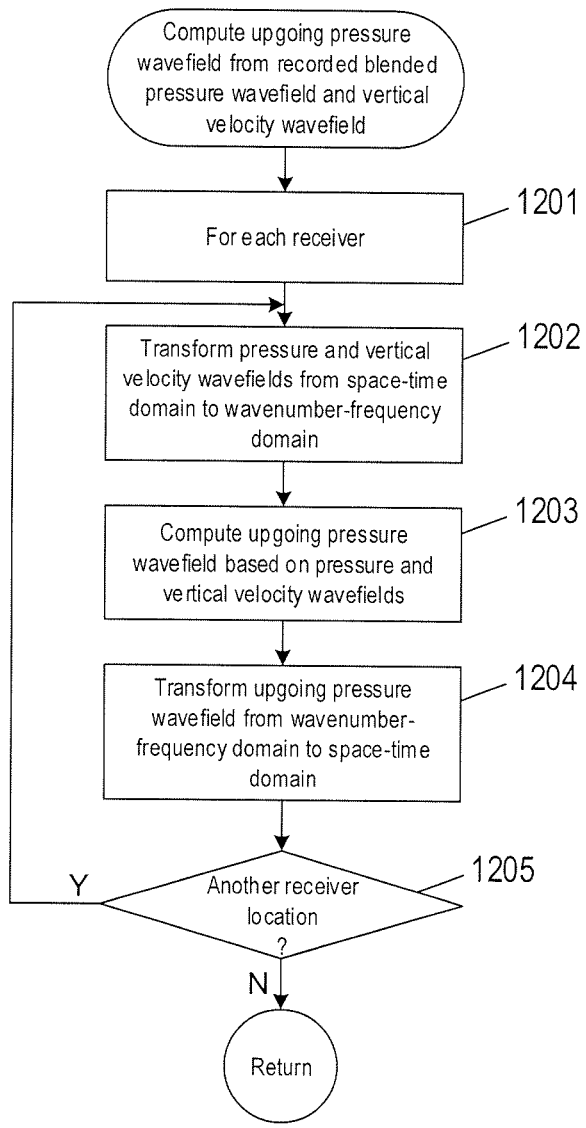
FIG. 12 is a flow diagram illustrating an example implementation of the "compute upgoing pressure wavefield from recorded blended pressure and vertical velocity seismic data" step referred to in FIG. 10.

Deblending and Attenuating Source Signature and Free-Surface Effects in Recorded Seismic Data The following description of FIGS. 7A-9C introduces the notation and terminology used to describe an example implementation of the processes and systems for deblending and attenuating source signature and free-surface effects in recorded blended seismic data referred to in step 603 of FIG. 6. Although FIGS. 7A-9C show a vertical plane cross-section of sources, receivers, a subterranean formation, and a free surface, the free surface and subterranean formations extend in the xy-plane and the sources and receivers do not necessarily lie in a vertical plane. FIGS. 10-12 are example flow diagrams of computational operations that may be carried out to deblend, and to attenuate the source signature and free-surface effects in, recorded blended seismic data.

Figures 7A, 7B:
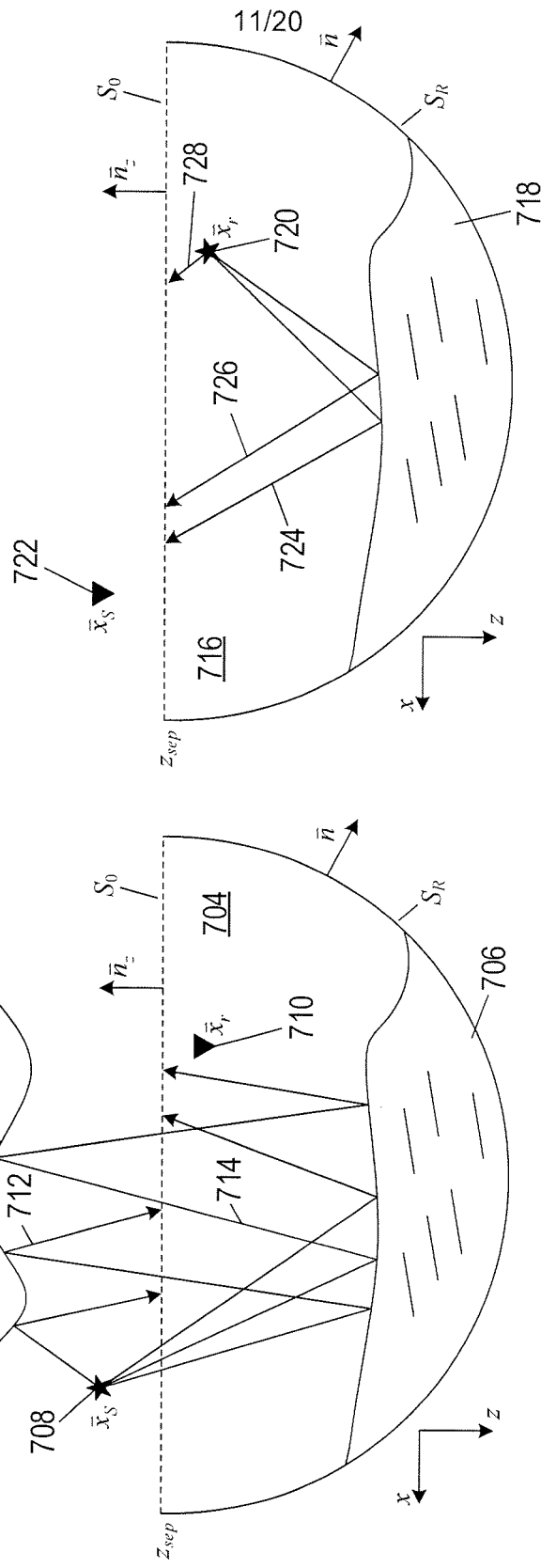
FIG. 7A shows a depth plane view of a physical state.
FIG. 7B shows a depth plane view of a virtual state.

FIG. 7A shows a depth plane view of a physical state denoted by C. Curve 702 represents a time-varying free surface, $S_f$, of a body of water 704 located above a subterranean formation 706. In FIG. 7C, a semicircular boundary, $S_R$, and a flat, horizontal separation level, $S_0$, enclose a hemispherical volume, V, that includes a portion of the body of water 704 and the subterranean formation 706. The hemispherical volume is shown in vertical plane cross-section. A source 708 is located above the separation level $S_0$ and a receiver 710 is located within the volume V. The source 708 represents an actual source towed by a survey vessel with source coordinates $\vec{x}_s=(x_s, y_s, z_s)$. The receiver 710 represents an actual receiver located within a streamer at the location $\vec{x}_r$. Points along the separation level $S_0$ are denoted by $\vec{x}_{sep}=(x, y, z_{sep})$, where $z_{sep}$ is the depth of the separation level below the free surface 702 with $z_s<z_{sep}<z_r$. The receiver 710 is a multicomponent receiver that includes a pressure sensor and one or more particle motion sensors, as described above with reference to FIG. 2. When the source 708 is activated, the source 708 produces an acoustic signal. Let $p_t^C(\vec{x}, t^C; \vec{x}_s, t_s)$ represent the pressure wavefield of an acoustic signal that interacts with the subterranean formation 706 and the time-varying free surface 702, where $t_s$ is the time when the source 708 is activated, $t^C$ is the time in the physical state C, and $\vec{x}$ is any point within the semicircular volume V. Downgoing directional arrows, such as directional arrow 712, represent ray paths of downgoing pressure wavefields reflected from the time-varying free surface $S_f$ 702. Upgoing directional arrows, such as directional arrow 714, represent rays of upgoing reflected pressure wavefields from the subterranean formation 706. The pressure wavefield $p_t^C(\vec{x}, t^C; \vec{x}_s, t_s)$ represents the upgoing and downgoing pressure wavefields created by the acoustic signal within the volume V. In physical state C, the pressure wavefields that interact with the time-varying free surface are non-stationary pressure wavefields. Pressure wavefields that do not interact with the time-varying free surface are stationary pressure wavefields. As shown in FIG. 7A, the upgoing and downgoing ray paths terminate at the separation level $S_0$. For each point $\vec{x}_{sep}$ along the separation level $S_0$, the pressure wavefield $p_t^C(\vec{x}_{sep}, t^C; \vec{x}_s, t_s)$ is defined as zero, because the separation level $S_0$ corresponds to points where the upgoing and downgoing pressure wavefields terminate. The acoustic signals generated by source 708 that are non-stationary can be denoted by $a^C(t^C-t_s)\delta(\vec{x}-\vec{x}_s)$, where $a^C(t^C-t_s)$ is a wavelet representation of the far-field amplitude of the acoustic signal.

FIG. 7B shows a depth plane view of a virtual state denoted by D. The semicircular boundary $S_R$ and separation level $S_0$ define a hemispherical volume V that includes a portion of a virtual body of water 716 and a virtual subterranean formation 718. The hemispherical volume V is shown in vertical plane cross-section. In virtual state D, the recorded pressure wavefield at each receiver location is time reversed, with the receiver 710 replaced by a virtual source 720 at the coordinate location $\vec{x}_r$ and the source 708 replaced by a virtual receiver 722 at the coordinate location $\vec{x}_s$. The virtual source 720 is located within the semicircular volume V. The virtual receiver 722 is located above the separation level $S_0$. Let $\tilde{p}^D(\vec{x}, t^D; \vec{x}_r, 0)$ represent a pressure wavefield generated by the virtual source 722, where $\vec{x}$ is any point in the semicircular volume V, $t^D$ is the time in the virtual state D, $\vec{x}_r$ is the coordinate location of the virtual source 720, time zero is the time when the virtual source 720 is activated, and tilde "~" denotes time moving backward. In the virtual state D, the pressure wavefields are stationary wavefields because the pressure wavefields generated by the virtual source 720 interact with the subterranean formation 718 and do not interact with a time-varying free surface. Upgoing directional arrows, such as directional arrows 724 and 726, represent ray paths of acoustic energy that has been generated by the virtual source 720 and has interacted with the subterranean formation 718 before being reflected upward to the separation level $S_0$. Ray path 728 represents upgoing acoustic energy that travels directly upward from the virtual source 720 to the separation level $S_0$. The pressure wavefields generated by the virtual source 720 can be denoted by $\delta(t^D)\delta(\vec{x}-\vec{x}_r)$.

A summary of the physical wavefields generated in the physical state C and the virtual wavefields generated in the virtual state D is displayed in Table I:

TABLE I

| | Physical State C | Virtual State D |
|---|---|---|
| Wavefield | $p_t^C(\vec{x}, t^C; \vec{x}_s, t_s)$<br>$p_t^C(\vec{x}, t^C; \vec{x}_s, t_s) = 0$ for $\vec{x} \in S_f(t^C)$ | $\tilde{p}^D(\vec{x}, t^D; \vec{x}_r, 0)$ |
| Source | $a^C(t^C - t_s)\delta(\vec{x} - \vec{x}_s)$ | $\delta(t^D)\delta(\vec{x} - \vec{x}_r)$ |

Applying the acoustic reciprocity theorem to the wavefields in physical state C and virtual state D (See e.g., *Seismic Applications of Acoustic Reciprocity*, by J. T Fokkema and P. M. van den Berg, pp. 95-103, Elsevier Science 1993) gives the following integral representation:

$$\int_V [p_t^C(\vec{x}, t^C; \vec{x}_s, t_s)\delta(t^D)\delta(\vec{x}-\vec{x}_R) - \tilde{p}^D(\vec{x}, t^D; \vec{x}_R, 0)a^C(t^C - t_s)\delta(\vec{x}-\vec{x}_s)]dV +$$

$$\int_V \left[\frac{1}{c^2}\left(p_t^C(\vec{x}, t^C; \vec{x}_s, t_s)\frac{\partial^2 \tilde{p}^D(\vec{x}, t^D; \vec{x}_R, 0)}{(\partial t^D)^2} - \tilde{p}^D(\vec{x}, t^D; \vec{x}_R, 0)\frac{\partial^2 p_t^C(\vec{x}, t^C; \vec{x}_s, t_s)}{(\partial t^C)^2}\right)\right]dV =$$

$$\int_S [p_t^C(\vec{x}, t^C; \vec{x}_s, t_s)\vec{\nabla}\tilde{p}^D(\vec{x}, t^D; \vec{x}_R, 0) - \tilde{p}^D(\vec{x}, t^D; \vec{x}_R, 0)\vec{\nabla}p_t^C(\vec{x}, t^C; \vec{x}_s, t_s)] \cdot \vec{n}dS$$

(2)

where $S = S_R + S_0$ is the outer surface of the semicircular volume V enclosed by the surfaces $S_R$ and $S_0$ in FIGS. 7A-7B; and $\vec{n}$ is the outward normal vector to the surface S in FIGS. 7A-7B.

Equation (2) relates volume integration over the semicircular volume V on the left-hand side of Equation (2) to a surface integral along the boundaries $S_R$ and $S_0$ of the semicircular volume V. Equation (2) relates the pressure wavefields of the physical state C to the virtual pressure wavefields of the virtual state D. Equation (2) may be simplified by separately considering the volume and surface integrals.

Begin by considering the surface integral (i.e., right-hand side) of Equation (2). As shown in FIG. 7B, only upgoing wavefields in the virtual state D are relevant, because there is no free surface to create downward reflected wavefields. As a result, only the upgoing wavefields of the virtual state D relate to the downgoing wavefields of the physical state C. FIG. 8A shows the physical state C with the ray paths of the upgoing wavefields shown in FIG. 7A removed. Applying source-receiver reciprocity to pressure wavefields in virtual state D, causes time to run forward, creating point sources along the separation level $S_0$ and the source 720 becomes a receiver. Ray paths of source wavefields created at points along the separation level $S_0$ are reflected from the subterranean formation 718 as upgoing wavefields 802 and 804 to the source 720, and others are direct downgoing wavefields 806 to the source 720. FIG. 8B shows an example of source-receiver reciprocity applied to the virtual state D of FIG. 7B. Ray paths 802, 804, and 806 represent reverse propagation of the wavefields represented by the ray paths 724, 726, and 728 in FIG. 7B.

Applying the Sommerfeld radiation condition (See e.g., *Optics lectures on theoretical physics*, Vol. IV., by A. Sommerfeld, N.Y., Academic Press Inc., 1954) to the surface integral over the surface $S_R$ in Equation (2) as the radius of the semicircular volume V approaches infinity reduces the surface integral as follows:

$$\int_S [p_t^C(\vec{x},t^C;\vec{x}_s,t_s) \vec{\nabla} p^D(\vec{x},t^D;\vec{x}_r,0) - p^D(\vec{x},t^D;\vec{x}_r,0)$$
$$\vec{\nabla} p_t^C(\vec{x},t^C;\vec{x}_s,t_s)] \cdot \vec{n} \, dS = -2 \int_{S_0} p^D(\vec{x}_r,t^D;\vec{x}_{sep},$$
$$0) \vec{\nabla} p_t^C(\vec{x}_{sep},t^C;\vec{x}_s,t_s)^{dn} \cdot \vec{n}_z dS_0 \quad (3)$$

In Equation (3), the normal vector $\vec{n}$ to the surface S reduces to a z-direction unit normal vector $\vec{n}_z$ for points along the separation level $S_0$, as shown in FIGS. 7A-8B. The result in Equation (3) follows from the Sommerfeld radiation condition, considering only up-going wavefields in the virtual state D before applying source-receiver reciprocity, and applying source-receiver reciprocity to wavefields in the virtual state D.

Next, consider the volume integral (i.e., left-hand side) of Equation (2). In physical state C, because the source 708 is located outside the semicircular volume V, as shown in FIGS. 7A and 8A, the first volume integral on the left-hand side of Equation (2) reduces to $p_t^C(\vec{x}_r,t^C;\vec{x}_s,t_s)\delta(t^D)$. Using the result in Equation (3), Equation (2) becomes $$p_t^C(\vec{x}_r,t^C;\vec{x}_s,t_s)\delta(t^D) + \int_V \left[\frac{1}{c^2}\left(p_t^C(\vec{x},t^C;\vec{x}_s,t_s)\frac{\partial^2 p^D(\vec{x}_r,t^D;\vec{x},0)}{(\partial t^D)^2} - \right. \right. \quad (4)$$

$$\left. \left. p^D(\vec{x}_r,t^D;\vec{x},0)\frac{\partial^2 p_t^C(\vec{x},t^C;\vec{x}_s,t_s)}{(\partial t^C)^2}\right)\right] dV =$$

$$-2\int_{S_0} p^D(\vec{x}_r,t^D;\vec{x}_{sep},0) \vec{\nabla} p_t^C(\vec{x}_{sep},t^C;\vec{x}_s,t_s)^{dn} \cdot \vec{n}_z dS_0$$

Movement of the pressure wavefields in the physical state C and the virtual state D is synchronized by introducing a global time denoted by $t=t^C+t^D$ and a time $\tau=t^C$. Integrating both sides of Equation (4) over all time $\tau$ permits application of causality conditions, which reduces the volume integral in Equation (4) to zero (*Fundamentals of Seismic Wave Propagation*, by C. H. Chapman, pp. 100-107 Cambridge University Press, 2004). The pressure wavefield on the left-hand side of Equation (4) reduces to a double integral equation given by:

$$p_t^C(\vec{x}_r,t;\vec{x}_s,t_s) = -2\int_{-\infty}^{\infty}\int_{S_0} p^D(\vec{x}_r,t-\tau;\vec{x}_{sep},0) \vec{\nabla} p_t^C(\vec{x}_{sep},\tau;\vec{x}_s,t_s)^{dn} \cdot \vec{n}_z dS_0 d\tau \quad (5)$$

In order to deblend the pressure wavefield, only primary pressure wavefield without the direct source wavefield (i.e., source signature) are considered. Wavefield separation is used to separate the recorded pressure wavefield $p_t^C(\vec{x}_r,t;\vec{x}_s,t_s)$ on the left-hand side of Equation (5) into upgoing and downgoing components, and to separate the subsurface reflectivity $p^D(\vec{x}_r,t-\tau;\vec{x}_{sep},0)$ into upgoing and downgoing pressure wavefields at the receiver 704 in physical state C. As a result, Equation (5) can be separated into up and downgoing components as follows:

$$p_t^C(\vec{x}_r,t;\vec{x}_s,t_s)^{up} + p_t^C(\vec{x}_r,t;\vec{x}_s,t_s)^{dn} = \quad (6a)$$

-continued $$-2\int_{-\infty}^{\infty}\int_{S_0} p^D(\vec{x}_r,t-\tau;\vec{x}_{sep},0)^{up} \vec{\nabla} p_t^C(\vec{x}_{sep},\tau;\vec{x}_s,t_s)^{dn} \cdot \vec{n}_z dS_0 d\tau -$$

$$2\int_{-\infty}^{\infty}\int_{S_0} p^D(\vec{x}_r,t-\tau;\vec{x}_{sep},0)^{dn} \vec{\nabla} p_t^C(\vec{x}_{sep},\tau;\vec{x}_s,t_s)^{dn} \cdot \vec{n}_z dS_0 d\tau$$

The upgoing component of the left-hand side of Equation (6a) is equal to integrating over the product of the upgoing subsurface reflectivity and the downgoing component of the gradient of the downgoing pressure wavefield measured at the separation level, giving:

$$p_t^C(\vec{x}_r,t;\vec{x}_s,t_s)^{up} = -2\int_{-\infty}^{\infty}\int_{S_0} p^D(\vec{x}_r,t-\tau;\vec{x}_{sep},0)^{up}$$
$$\vec{\nabla} p_t^C(\vec{x}_{sep},\tau;\vec{x}_s,t_s)^{dn} \cdot \vec{n}_z dS_0 d\tau \quad (6b)$$

The upgoing surface reflectivity in Equation (6b) is the primary pressure wavefield with the direct source wavefield (i.e., source signature) and free surface effects attenuated. Equation (6b) may be used to compute separate primary pressure wavefields for separate shot records, as explained below with reference to Equations (15)-(20). Equation (6b) is the basis for computing deblended primary pressure wavefields from recorded blended seismic data, as explained below with reference to Equations (21)-(26).

The upgoing pressure wavefield $p_t^C(\vec{x}_r,t;\vec{x}_s,t_s)^{up}$ and the gradient of the downgoing pressure wavefield $\vec{\nabla} p_t^C(\vec{x}_{sep},\tau;\vec{x}_s,t_s)^{dn}$ of Equation (6b) may be computed using wavefield separation as follows. The pressure wavefield $p_t^C(\vec{x}_r,t;\vec{x}_s,t_s)$ and the vertical velocity wavefield $v_{z,t}^C(\vec{x}_r,t;\vec{x}_s,t_s)$ recorded at each receiver location $\vec{x}_r$ are transformed from the space-time domain to the frequency-wavenumber domain as follows:

$$p_t^C(\vec{x}_r,t;\vec{x}_s,t_s) \to P^C(k_x,k_y,\omega|z_r) \quad (7a)$$

$$v_{z,t}^C(\vec{x}_r,t;\vec{x}_s,t_s) \to V_z^C(k_x,k_y,\omega|z_r) \quad (7b)$$

where
$k_x$ is the wavenumber in the x-direction;
$k_y$ is the wavenumber in the y-direction; and
$\omega$ is the angular frequency.

Transformation of the recorded pressure and vertical velocity wavefields may be performed using a discrete Fourier transform ("DFT") or a fast Fourier transform ("FFT"). Wavefield separation gives the upgoing pressure wavefield in the frequency-wavenumber domain:

$$P^C(k_x,k_y,\omega|z_r)^{up} = \frac{1}{2}\left[P^C(k_x,k_y,\omega|z_r) - \frac{\omega\rho}{k_z}V_z^C(k_x,k_y,\omega|z_r)\right] \quad (8)$$

where $$k_z = \sqrt{\left(\frac{\omega}{c}\right)^2 - k_x^2 - k_y^2}$$

is the wavenumber in the z-direction;
$\rho$ is the density of water; and
c is the speed of sound in water.

Using inverse DFT ("IDFT") or inverse FFT ("IFFT"), the upgoing pressure wavefield in Equation (8) is transformed to the space-time domain to obtain the upgoing pressure wavefield on the left-hand side of Equation (6b):

$$P^C(k_x,k_y,\omega|z_r)^{up} \to p_t^C(\vec{x}_R,t;\vec{x}_s,t_s)^{up} \quad (9)$$

Wavefield separation also gives the downgoing vertical velocity wavefield in the wavenumber-frequency domain:

$$V_{z,t}^C(k_x, k_y, \omega | z_R)^{dn} = \frac{1}{2}\left[V_z^C(k_x, k_y, \omega | z_R) + \frac{k_z}{\omega\rho}P^C(k_x, k_y, \omega | z_R)\right] \quad (10)$$

The downgoing vertical velocity at the receiver 720 is extrapolated upward to the separation level $S_0$:

$$V_{z,t}^C(k_x,k_y,\omega|z_{sep})^{dn} = V_{z,t}^C(k_x,k_y,\omega|z_R)^{dn} \exp(ik_z(z_R - z_{sep})) \quad (11)$$

where $\exp(ik_z(z_R - z_{sep}))$ is an extrapolation operator from the receiver depth to the depth of the separation level. The downgoing vertical velocity wavefield in Equation (11) is transformed from the wavenumber-frequency domain to the space-frequency domain using IDFT or IFFT to obtain the downgoing vertical velocity wavefield along the separation level $S_0$:

$$V_{z,t}^C(k_x,k_y,\omega|z_{sep})^{dn} \rightarrow v_{z,t}^C(\vec{x}_{sep},\omega;\vec{x}_s,t_s)^{dn} \quad (12)$$

The gradient of the downgoing pressure wavefield is given by the following equation of motion:

$$\nabla p_t^C(\vec{x}_{sep},\omega;\vec{x}_s,t_s)^{dn}\cdot\vec{n}_z = -i\omega\rho v_{z,t}^C(\vec{x}_{sep},\omega;\vec{x}_s,t_s)^{dn} \quad (13)$$

The gradient of the downgoing pressure wavefield in Equation (13) is transformed from the space-frequency domain to the space-time domain using IDFT or IFFT to obtain the gradient of the downgoing pressure wavefield along the separation level $S_0$ in the integrand of Equation (6b):

$$\nabla p_t^C(\vec{x}_{sep},\omega;\vec{x}_s,t_s)^{dn}\cdot\vec{n}_z \rightarrow \nabla p_t^C(\vec{x}_{sep},\tau;\vec{x}_s,t_s)^{dn}\cdot\vec{n}_z \quad (14)$$

Alternatively, for a depth varying acquisition surface, wavefield separation may be performed as described in U.S. patent application Ser. No. 16/049,446, filed Jul. 30, 2018, and owned by PGS Geophysical AS, the contents of which are hereby incorporated as if fully set forth herein.

Consider recording seismic data in N separate shot records following N separate source activations, as described above with reference to FIG. 5A. Equation (6b) holds for each shot record, which may be presented as a system of N integral equations:

$$p_t^C(\vec{x}_r,t;\vec{x}_{si},t_{si})^{up} = -2\int_{-\infty}^{\infty}\int_{S_0} p^D(\vec{x}_r,t-\tau;\vec{x}_{sep},0)^{up}$$
$$\vec{\nabla}p_t^C(\vec{x}_{sep},\tau;\vec{x}_{si},t_{si})^{dn}\cdot\vec{n}_z dS_0 d\tau \quad (15)$$

where
subscript i is a source index; and
i=1, . . . , N.

Each of the N equations in Equation (15) is obtained from recording non-blended seismic data in separate shot records, as described above with reference to FIG. 5A. The integrals in Equation (15) can be interchanged to give $$p_t^C(\vec{x}_r,t;\vec{x}_{si},t_{si})^{up} = -2\int_{S_0}\int_{-\infty}^{\infty} p^D(\vec{x}_r,t-\tau;\vec{x}_{sep},0)^{up}$$
$$\vec{\nabla}p_t^C(\vec{x}_{sep},\tau;\vec{x}_{si},t_{si})^{dn}\cdot\vec{n}_z d\tau dS_0 \quad (16a)$$

By the definition of convolution, Equation (16a) becomes $$p_t^C(\vec{x}_r,t;\vec{x}_{si},t_{si})^{up} = -2\int_{S_0} p^D(\vec{x}_r,t;\vec{x}_{sep},0)^{up} * \vec{\nabla}p_t^C(\vec{x}_{sep},t;\vec{x}_{si},t_{si})^{dn}\cdot\vec{n}_z dS_0 \quad (16b)$$

Equation (16) is transformed from the space-time domain to the space-frequency domain using DFT or FFT, giving:

$$P_t^C(\vec{x}_r,\omega;\vec{x}_{si},t_{si})^{up} = -2\int_{S_0} p^D(\vec{x}_r,\omega;\vec{x}_{sep},0)^{up} \vec{\nabla}P_t^C(\vec{x}_{sep},\omega;\vec{x}_{si},t_{si})^{dn} dS_0 \quad (17)$$

The relationship between the upgoing pressure wavefield and the product of the primary pressure wavefield and the gradient of the downgoing pressure wavefield in the space-frequency domain in Equation (17) is approximated by the following summation:

$$P_t^C(\vec{x}_r,\omega;\vec{x}_{si},t_{si})^{up} \approx$$
$$-2\sum_{\vec{x}_{sep}\in S_0} P^D(\vec{x}_r,\omega;\vec{x}_{sep},0)^{up}\vec{\nabla}P_t^C(\vec{x}_{sep},\omega;\vec{x}_{si},t_{si})^{dn}\Delta x\Delta y \quad (18)$$

where
$\Delta x$ is the inline receiver spacing; and
$\Delta y$ is the crossline receiver spacing.
The summation in Equation (18) may be rewritten as a matrix equation:

$$P_{t_i}^C \approx -2P^{Dup}\vec{\nabla}P_{t_i}^{Cdn} \quad (19)$$

Equation (19) holds for N separate shot records as represented by the following system of equations:

$$P_{t_1}^C \approx -2P^{Dup}\vec{\nabla}P_{t_1}^{Cdn} \quad (20)$$
$$\vdots$$
$$P_{t_N}^C \approx -2P^{Dup}\vec{\nabla}P_{t_N}^{Cdn}$$

The system of N equations represented by system of Equations (20) relates the non-stationary upgoing pressure wavefield, $p_t^C(\vec{x}_r,\omega;\vec{x}_{si},t_{si})^{up}$, to the non-stationary gradient of the downgoing pressure wavefield, $\vec{\nabla}p_t^C(\vec{x}_{sep},\omega;\vec{x}_{si},t_{si})^{dn}$, and the primary pressure wavefield, $p^D(\vec{x}_r,\omega;\vec{x}_{sep},0)^{up}$. The non-stationary upgoing pressure wavefield matrix, $P_{t_i}^C$ and the non-stationary gradient of downgoing pressure wavefield matrix, $\vec{\nabla}p_{t_i}^{Cdn}$ in system of Equations (20) are obtained from non-blended shot records obtained in a traditional marine seismic survey, as described above with reference to FIG. 5A. The system of Equations (20) is a system of equations that may be solved for the primary pressure wavefield matrix $P^{Dup}$ using matrix inversion, provided the number of sources is greater than or equal to the number of points along the separation level $S_0$ and the separation level corresponds to the streamers. The matrix elements of the primary pressure wavefield matrix are the primary pressure wavefield at receiver locations, $p^D(\vec{x}_r,\omega;\vec{x}_{sep},0)^{up}$, with attenuated source wavefield and free-surface effects. The primary pressure wavefield may be transformed back to the space-time domain using inverse DFT or inverse FFT:

$$p^D(\vec{x}_r,\omega;\vec{x}_{sep},0)^{up} \rightarrow p^D(\vec{x}_r,t;\vec{x}_{sep},0)^{up}$$

Each primary pressure wavefield at receiver locations $p^D(\vec{x}_r,t;\vec{x}_{sep},0)^{up}$ comprises a trace of seismic data with attenuated source signature and free surface effects. The primary pressure wavefield at the receiver locations may be further processed, as described above with reference to FIG. 6, to generate images of the subterranean formation. The resolution of each image is enhanced by attenuation of the source signatures and free-surface effects.

Summing Equation (17) for the N source activations gives an expression for blended seismic data obtain using SSA:

$$\sum_{i=1}^N p_t^C(\vec{x}_r,t;\vec{x}_{si},t_{si})^{up} =$$

-continued $$-2\sum_{i=1}^{N}\left\{\int_{-\infty}^{\infty}\int_{S_0}p^D(\vec{x}_r,t-\tau,\vec{x}_{sep},0)^{up}\nabla p_t^C(\vec{x}_{sep},\tau;\vec{x}_{si},t_{si})^{dn}\cdot\vec{n}_z dS_0 d\tau\right\}$$

Interchanging summation and integration on the right-hand side gives an equation of blended seismic data:

$$\sum_{i=1}^{N}p_t^C(\vec{x}_r,t;\vec{x}_{si},t_{si})^{up} = \qquad (21)$$

$$-2\int_{-\infty}^{\infty}\int_{S_0}p^D(\vec{x}_r,t-\tau,\vec{x}_{sep},0)^{up}\sum_{i=1}^{N}\nabla p_t^C(\vec{x}_{sep},\tau;\vec{x}_{si},t_{si})^{dn}\cdot\vec{n}_z dS_0 d\tau$$

The source locations $\vec{x}_{si}$ and the activation times $t_{si}$ may be arbitrary in SSA for N source activations. For example, the sources may be located anywhere around the seismic data acquisition surface, and the activation times may be a random sequence of activation times, as described above with reference to FIG. 5B, or the activation times may be a predetermined sequence. The sequence of activation times creates overlapping reflected wavefields that are recorded as blended seismic data by the receivers of the acquisition surface, as described above with reference to FIG. 5C.

In Equation (21), the left-hand side summation $\Sigma_{i=1}^{N}p_t^C(\vec{x}_r, t; \vec{x}_{si}, t_{si})^{up}$ represents the upgoing pressure wavefield of continuously recorded blended seismic data at the receiver location $\vec{x}_r$ for N source activations. The right-hand side summation $\Sigma_{i=1}^{N}\vec{\nabla}p_t^C(\vec{x}_{sep},\tau; \vec{x}_{si}, t_{si})^{dn}$ is the gradient of the downgoing pressure wavefield of blended seismic data at a point $\vec{x}_{sep}$ along the separation level for N source activations. Equation (21) relates the upgoing pressure wavefield of blended seismic data to the primary pressure wavefield $p^D(\vec{x}_r, t-\tau; \vec{x}_{sep}, 0)^{up}$. The upgoing pressure wavefield $\Sigma_{i=1}^{N}p_t^C(\vec{x}_r, t; \vec{x}_{si}, t_{si})^{up}$ and the gradient of the downgoing pressure wavefield $\Sigma_{i=1}^{N}\vec{\nabla}p_t^C(\vec{x}_{sep},\tau; \vec{x}_{si}, t_{si})^{dn}$ of Equation (21) may be computed from a blended pressure wavefield, denoted by $\Sigma_{i=1}^{N}p_t^C(\vec{x}_r, t; \vec{x}_{si}, t_{si})$, and a blended vertical velocity wavefield, denoted by $\Sigma_{i=1}^{N}v_{z,t}^C(\vec{x}_r, t; \vec{x}_{si}, t_{si})$, using wavefield separation in the manner described above with reference to Equations (7)-(13). The blended pressure wavefield $\Sigma_{i=1}^{N}p_t^C(\vec{x}_r, t; \vec{x}_{si}, t_{si})$ and the blended vertical velocity wavefield $\Sigma_{i=1}^{N}v_{z,t}^C(\vec{x}_r, t; \vec{x}_{si}, t_{si})$ are recorded in separate shot records by co-located pressure and particle motion sensors for N source activations using SSA, as described above with reference to FIG. 5B-5C.

Figure 9A:
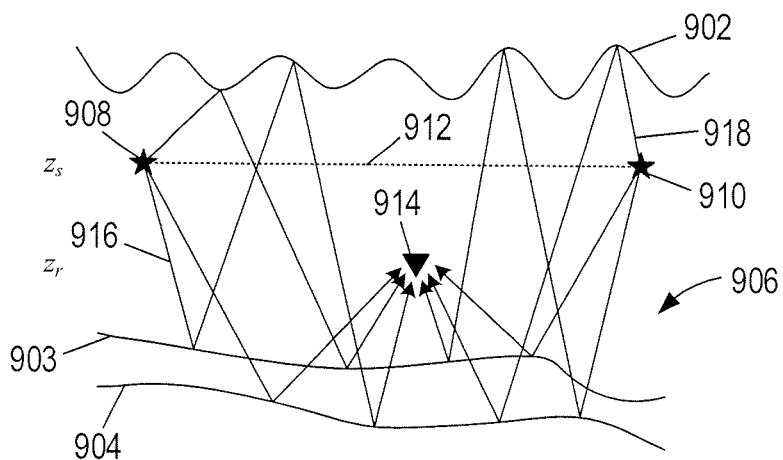
FIGS. 9A-9C show example ray paths of wavefields that interact with a subterranean formation and a free surface.
Figure 9B:
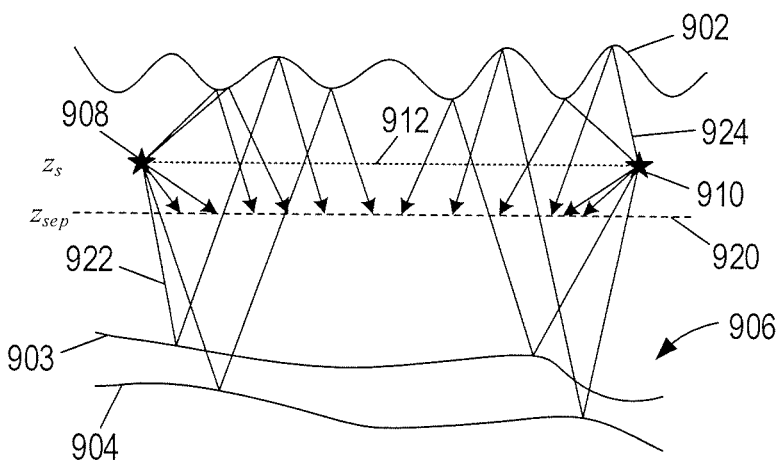
Figure 9C:
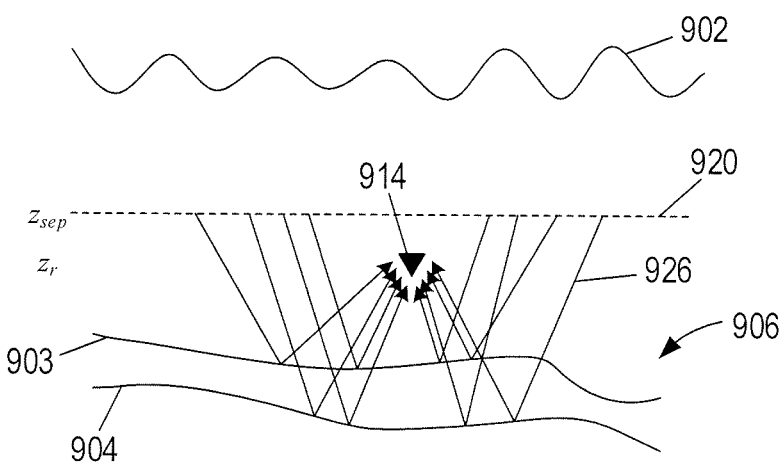

FIGS. 9A-9C show example ray paths of the wavefields characterized in Equation (21) for two sources and one receiver. In FIGS. 9A-9C, curve 902 represents the free surface of a body of water and curves 903 and 904 represent a surface and interface, respectively, of a subterranean formation 906. Two sources 908 and 910 are located at different inline and crossline coordinates but at the same depth $z_S$, as indicated by dotted line 912. Receiver 914 is located at depth $z_R$.

FIG. 9A shows example ray paths of an upgoing pressure wavefield of blended seismic data in Equation (21) for the two sources 908 and 910 and receiver 914. The ray paths represent acoustic energy that has been generated by two sources 908 and 910 and has been reflected at least once from the free surface 902 and the subterranean formation 906 before traveling upward to the receiver 914. For example, ray path 916 represents acoustic energy that has been reflected from the surface 903, the free surface 902, and the interface 904 before traveling upward to the receiver 914. Ray path 918 represents acoustic energy that has been reflected from the free surface 902 and the interface 904 before traveling upward to the receiver 914.

FIG. 9B shows examples of ray paths of a downgoing vertical velocity wavefield of blended seismic data in Equation (21) for the two sources 908 and 910 and the receiver 914. The ray paths represent acoustic energy that has been generated by the two sources 908 and 910 and has been reflected downward from the free surface 902 before reaching points along a separation level 920 at a depth $z_{sep}$. For example, ray path 922 represents acoustic energy that has been reflected from the surface 903 and the free surface 902 before traveling downward to a point along the separation level 920. Ray path 924 represents acoustic energy that has been reflected from the free surface 902 before traveling downward to a point along the separation level 920.

FIG. 9C shows examples of ray paths of the primary pressure wavefield $p^D(\vec{x}_r, t-\tau; \vec{x}_{sep}, 0)^{up}$ in Equation (21). The ray paths represent acoustic energy emitted downward from points along the separation level 920 and reflected upward from the subterranean formation 906 to the receiver 914. For example, ray path 926 represents acoustic energy that is emitted from a point along the separation level 920, travels to the interface 904, and is reflected upward to the receiver 914.

Because Equation (21) is underdetermined, Equation (21) is transformed into a numerically solvable system of equations by convolving both sides of Equation (21) with a time-reversed gradient of the downgoing pressure wavefield, $\Sigma_{i=1}^{N}\vec{\nabla}p_t^C(\vec{x}_A, -t; \vec{x}_{si}, t_{si})^{dn}$, where $\vec{x}_A=(x, y, z_A)$ is a point on a receiving surface $S_A$. The receiving surface $S_A$ may be located between the separation level $S_0$ and the depth of the source, where $z_s \leq z_A \leq z_{sep}$. In other words, the receiving surface $S_A$ may be located at the same depth as the separation level $S_0$, in which case $z_A=z_{sep}$, or at the depth of the source, in which case $z_A=z_s$. Convolving Equation (21) by the time-reversed gradient of the downgoing pressure wavefield of blended seismic data gives $$c_t(\vec{x}_r, t; \vec{x}_A) = \qquad (22a)$$

$$-2\int_{-\infty}^{\infty}\int_{S_0}p^D(\vec{x}_r, t-\tau; \vec{x}_{sep}, 0)^{up}(\gamma_t(\vec{x}_{sep},\tau;\vec{x}_A)\cdot\vec{n}_z dS_0 d\tau$$

where $$c_t(\vec{x}_r, t; \vec{x}_A) = \sum_{i=1}^{N}p_t^C(\vec{x}_r, t; \vec{x}_{si}, t_{si})^{up} * \sum_{i=1}^{N}\vec{\nabla}p_t^C(\vec{x}_A, -t; \vec{x}_{si}, t_{si})^{dn} \qquad (22b)$$

$$\gamma_t(\vec{x}_{sep},\tau;\vec{x}_A) = \qquad (22c)$$

$$\sum_{i=1}^{N}\vec{\nabla}p_t^C(\vec{x}_{sep},\tau;\vec{x}_{si}, t_{si})^{dn} * \sum_{i=1}^{N}\vec{\nabla}p_t^C(\vec{x}_A, -t; \vec{x}_{si}, t_{si})^{dn}$$

Equation (22b) is the cross-correlation wavefield of the upgoing pressure wavefield convolved with the time-reversed gradient of the downgoing pressure wavefield of blended seismic data. Equation (22c) is the point-spread function of the gradient of the downgoing pressure wavefield convolved with the time-reversed gradient of the downgoing pressure wavefield.

By interchanging the integrals in Equation (22a) and applying the definition of convolution, Equation (22a) becomes $$c_t(\vec{x}_r, t; \vec{x}_A) = -2 \int_{S_0} p^D(\vec{x}_r, t; \vec{x}_{sep}, 0)^{up} * \gamma_t(\vec{x}_{sep}, t; \vec{x}_A) \cdot \vec{n}_z dS_0 \quad (23)$$

where $$\gamma_t(\vec{x}_{sep}, t; \vec{x}_A) = \sum_{i=1}^{N} \vec{\nabla} p_t^C(\vec{x}_{sep}, t; \vec{x}_{si}, t_{si})^{dn} * \sum_{i=1}^{N} \vec{\nabla} p_t^C(\vec{x}_A, -t; \vec{x}_{si}, t_{si})^{dn}$$

Equation (23) may be solved for the primary pressure wavefield $p^D(\vec{x}_r, t; \vec{x}_{sep}, 0)^{up}$ by transforming Equation (23) from the space-time domain to the space-frequency domain using DFT or FFT as follows:

$$C_t(\vec{x}_r, \omega; \vec{x}_A) \approx -2 \sum_{\vec{x}_{sep} \in S_0} p^D(\vec{x}_r, \omega; \vec{x}_{sep}, 0)^{up} \Gamma_t(\vec{x}_{sep}, \omega; \vec{x}_A) \Delta x \Delta y \quad (24a)$$

In the space-frequency domain, the cross-correlation of Equation (22b) becomes $$C_t(\vec{x}_r, \omega; \vec{x}_A) = \sum_{i=1}^{N} P_t^C(\vec{x}_r, \omega; \vec{x}_{si}, t_{si})^{up} \sum_{i=1}^{N} \overline{\vec{\nabla} P_t^C}(\vec{x}_A, \omega; \vec{x}_{si}, t_{si})^{dn} \quad (24b)$$

In the space-frequency domain, the point-spread function of Equation (22c) becomes $$\Gamma_t(\vec{x}_{sep}, \omega; \vec{x}_A) = \sum_{i=1}^{N} \vec{\nabla} P_t^C(\vec{x}_{sep}, \omega; \vec{x}_{si}, t_{si})^{dn} \sum_{i=1}^{N} \overline{\vec{\nabla} P_{z,t}^C}(\vec{x}_A, \omega; \vec{x}_{si}, t_{si})^{dn} \quad (24c)$$

where the overbar represents complex conjugate.

Equation (24a) relates the upgoing pressure wavefield to the primary pressure wavefield by way of the point spread function. For recorded blended seismic data obtained with N source activations, M receivers, K points along the separation level $S_0$, and J points along the receiving surface $S_A$, Equation (24a) leads to the following matrix equation in the space-frequency domain:

$$C \approx -2 P^{Dup} \Gamma \quad (25)$$

where
C is an M×J cross-correlation wavefield matrix;
$P^{Dup}$ is an M×K primaries wavefield matrix; and
$\Gamma$ is a K×J point-spread function matrix.
The elements of the cross-correlation wavefield matrix C are denoted by $C_t(\vec{x}_r^{(m)}, \omega; \vec{x}_A^{(j)})$, where m=1, . . . , M and j=1, . . . , J. The elements of the primaries wavefield matrix $P^{Dup}$ are denoted by $P^D(\vec{x}_r^{(m)}, \omega; \vec{x}_{sep}^{(k)})^{up}$, where K=1, . . . , K are the number of points along the separation level. Each element $P^D(\vec{x}_r^{(m)}, \omega; \vec{x}_{sep}^{(k)})^{up}$ of the primaries wavefield matrix $P^{Dup}$ is a trace of deblended seismic data that contains the primary pressure wavefield recorded at the m-th receiver with attenuated source signature and free surface effects. The elements of the point-spread function matrix $\Gamma$ are denoted by $\Gamma_t(\vec{x}_{sep}^{(k)}, \omega; \vec{x}_A^{(j)})$. Each element of the cross-correlation wavefield matrix C is related to elements in the primaries wavefield matrix $P^{Dup}$ and the point-spread function matrix $\Gamma$ by the following equation $$C_t(\vec{x}_r^{(m)}, \omega; \vec{x}_A^{(j)}) \approx -2 \sum_{k=1}^{K} P^D(\vec{x}_r^{(m)}, \omega; \vec{x}_{sep}^{(k)})^{up} \Gamma_t(\vec{x}_{sep}^{(k)}, \omega; \vec{x}_A^{(j)}) \quad (26)$$

Regularization may be applied to regularize the spatial coordinates of the seismic data to regularly spaced points of a grid or mesh. Regularization corrects irregularly spaced receiver locations in the in-line and cross-lines coordinates of the traces to points of a regularly spaced grid or mesh of receiver locations.

Because the sources have been transformed to points along the receiving surface $S_A$, Equation (25) is a solvable system of equations for K equal to the number of points along the separation level $S_0$ (i.e., J=K). Matrix Equation (25) represents a determined system of equations that may be solved for the M×K elements $P^D(\vec{x}_r^{(m)}, \omega; \vec{x}_{sep}^{(k)})^{up}$ using numerical techniques, such as matrix inversion. Each element $P^D(\vec{x}_r^{(m)}, \omega; \vec{x}_{sep}^{(k)})^{up}$ of the primaries wavefield matrix may be inverse transformed from the space-frequency domain to the space-time domain using IDFT or IFFT to give a trace $p^D(\vec{x}_r^{(m)}, t)^{up}$ of a primary pressure wavefield with attenuated source signatures and free-surface effects, where the separation level coordinates correspond to points along the streamers. The set of M traces $\{p^D(\vec{x}_r^{(m)}, t)^{up}\}_{m=1}^{M}$ represents the deblended primary pressure wavefield with attenuated source signatures and free-surface effects. The step of M traces may be sorted into different domains (e.g., common-shot domain, common-midpoint domain, common-receiver domain, and common-receiver-station domain) to form gathers of the deblended primary pressure wavefield data with attenuated source signatures and free-surface effects. The deblended primary pressure wavefield may be used to compute images of the subterranean formation as described above with reference to FIG. 6.

FIG. 10 is a flow diagram illustrating an example implementation of the "compute deblended primary pressure wavefield with attenuated source signature and free-surface effects" step referred to in block 603 of FIG. 6. In block 1001, a "compute gradient of downgoing pressure wavefields from recorded blended pressure and vertical velocity seismic data" procedure is performed. In block 1002, a "compute upgoing pressure wavefield from recorded blended pressure and vertical velocity seismic data" procedure is performed. In block 1003, a "compute deblended primary pressure wavefield based on the upgoing pressure wavefield and the gradient of the downgoing pressure wavefield" procedure is performed.

FIG. 11 is a flow diagram illustrating an example implementation of the "compute gradient of downgoing pressure wavefields from recorded blended pressure and vertical velocity seismic data" step referred to in block 1001 of FIG. 10. A loop beginning with block 1101 repeats the computational operations represented by blocks 1102-1107 for each receiver. In block 1102, the blended pressure and vertical velocity wavefields are transformed from the space-time domain to the wavenumber-frequency domain, as described above with reference to Equations (7a) and (7b). In block 1103, a downgoing vertical velocity wavefield is computed as described above with reference to Equation (10). In block 1104, the downgoing vertical velocity wavefield is extrapolated from the receiver depth to the depth of the separation level. In block 1105, the gradient of the downgoing pressure wavefield is computed from the extrapolated downgoing vertical velocity wavefield as described above with reference to Equations (12) and (13). In block 1106, the gradient of the downgoing pressure wavefield is transformed to the space-time domain. In decision block 1107, the computational operations of blocks 1102-1106 are repeated for another receiver location.

FIG. 12 is a flow diagram illustrating an example implementation of the "compute upgoing pressure wavefield from recorded blended pressure and vertical velocity seismic data" step referred to in block 1002 of FIG. 10. A loop beginning with block 1201 repeats the computational operations represented by blocks 1202-1205 for each receiver. In block 1202, the blended pressure and vertical velocity wavefields are transformed from the space-time domain to the wavenumber-frequency domain, as described above with reference to Equations (7a) and (7b). In block 1203, an upgoing pressure wavefield is computed as described above with reference to Equation (8). In decision block 1204, the upgoing pressure wavefield is transformed to the space-time domain. In decision block 1205, the computational operations of blocks 1202-1204 are repeated for another receiver location.

Figure 13:
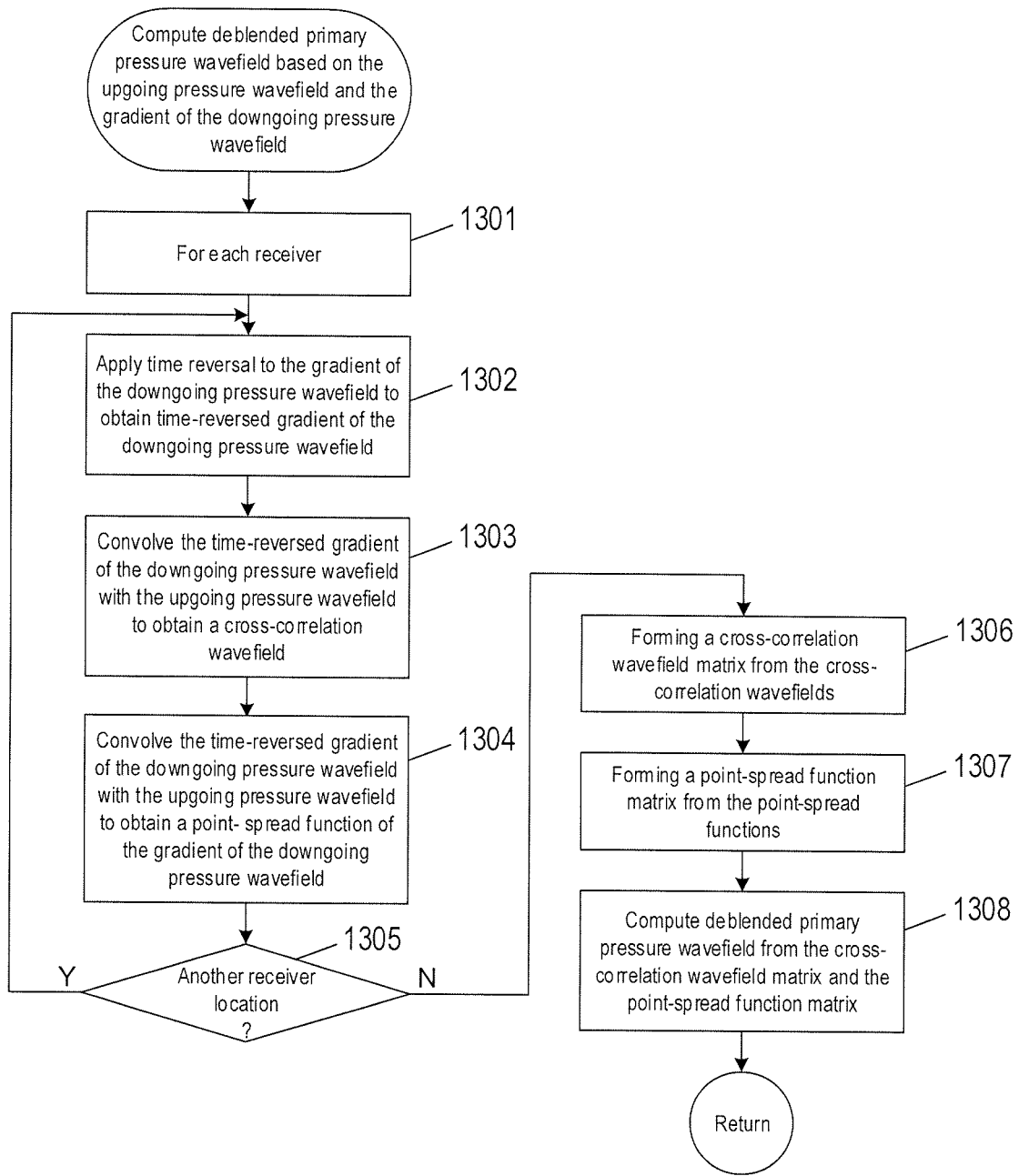
FIG. 13 is a flow diagram illustrating an example implementation of the "compute deblended primary pressure wavefield based on the upgoing pressure wavefield and the gradient of the downgoing pressure wavefield" step referred to in FIG. 10.

FIG. 13 is a flow diagram illustrating an example implementation of the "compute deblended primary pressure wavefield based on the upgoing pressure wavefield and the gradient of the downgoing pressure wavefield" step referred to in block 1002 of FIG. 10. A loop beginning with block 1301 repeats the computational operations represented by blocks 1302-1304 for each receiver. In block 1302, time reversal is applied to the gradient of the downgoing pressure wavefield to obtain a time-reversed gradient of the downgoing pressure wavefield. In block 1303, the time-reversed gradient of the downgoing pressure wavefield is convolved with the upgoing pressure wavefield to obtain cross-correlation wavefield of the upgoing pressure wavefield and the gradient of the downgoing pressure wavefield, as described above with reference to Equation (22b). In block 1304, the time-reversed gradient of the downgoing pressure wavefield is convolved with the gradient of the downgoing pressure wavefield to obtain a point-spread function of the gradient of the downgoing pressure wavefield, as described above with reference to Equation (22c). In decision block 1305, the operations represented by blocks 1302-1304 are repeated for another receiver location. In block 1306, a cross-correlation matrix is formed from the cross-correlation wavefields computed in block 1303, as described above with reference to Equations (24b) and (25). In block 1307, a point-spread function matrix is formed from the point-spread functions computed in block 1304, as described above with reference to Equations (24c) and (25). In block 1308, deblended primary pressure wavefield is computed from the cross-correlation wavefield matrix and the point-spread function matrix using matrix inversion, as described above with reference (25). The deblended primary pressure wavefield may be used to compute images of the subterranean formation as described above with reference to FIG. 6.

Figure 14:
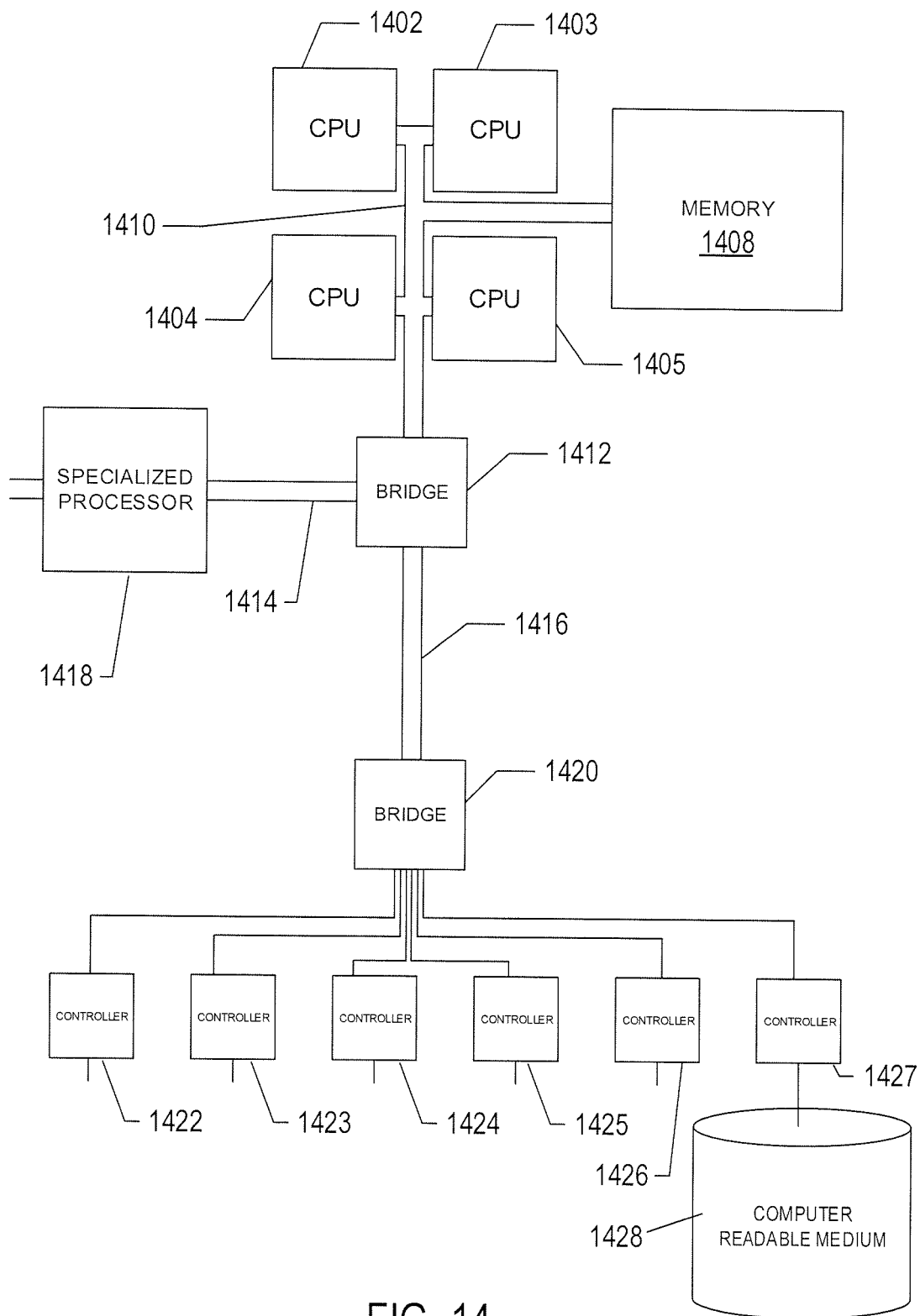
FIG. 14 shows an example computer system that may be used to execute an efficient process for generating an image of a subterranean formation.

FIG. 14 shows an example computer system that may be used to execute an efficient process for generating an image of subterranean formation according to the above-described methods and therefore represents a geophysical-analysis data-processing system. The internal components of many small, mid-sized, and large computer systems as well as specialized processor-based storage systems can be described with respect to this generalized architecture, although each system may feature many additional components, subsystems, and similar, parallel systems with architectures similar to this generalized architecture. The computer system contains one or multiple central processing units ("CPUs") 1402-1405, one or more electronic memories 1408 interconnected with the CPUs by a CPU/memory-subsystem bus 1410 or multiple busses, a first bridge 1412 that interconnects the CPU/memory-subsystem bus 1410 with additional busses 1414 and 1416, or other types of high-speed interconnection media, including multiple, high-speed serial interconnects. The busses or serial interconnections, in turn, connect the CPUs and memory with specialized processors, such as a graphics processor 1418, and with one or more additional bridges 1420, which are interconnected with high-speed serial links or with multiple controllers 1422-1427, such as controller 1427, that provide access to various different types of computer-readable media, such as computer-readable medium 1428, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 1428 is a data-storage device, including electronic memory, optical or magnetic disk drive, a magnetic tape drive, USB drive, flash memory and other such data-storage device. The computer-readable medium 1428 can be used to store machine-readable instructions that encode the computational methods described above and can be used to store encoded data, during store operations, and from which encoded data can be retrieved, during read operations, by computer systems, data-storage systems, and peripheral devices.

The processes and systems disclosed herein may be used to manufacture a geophysical data product indicative of certain properties of a subterranean formation. A geophysical data product may be manufactured by using the processes and systems described herein to generate geophysical data and store the geophysical data in a computer-readable medium 1428. The geophysical data may be, for example, pressure wavefield, vertical velocity wavefield, upgoing and downgoing pressure wavefields, a gradient of downgoing pressure wavefield, primary pressure wavefield, deblended primary pressure wavefield, and any image of a subterranean formation computed using the processes and systems described herein. The geophysical data product may be produced offshore (i.e., by equipment on the survey vessel 102) or onshore (i.e., at a computing facility on land), or both.

Simulation Results

Figure 15A:
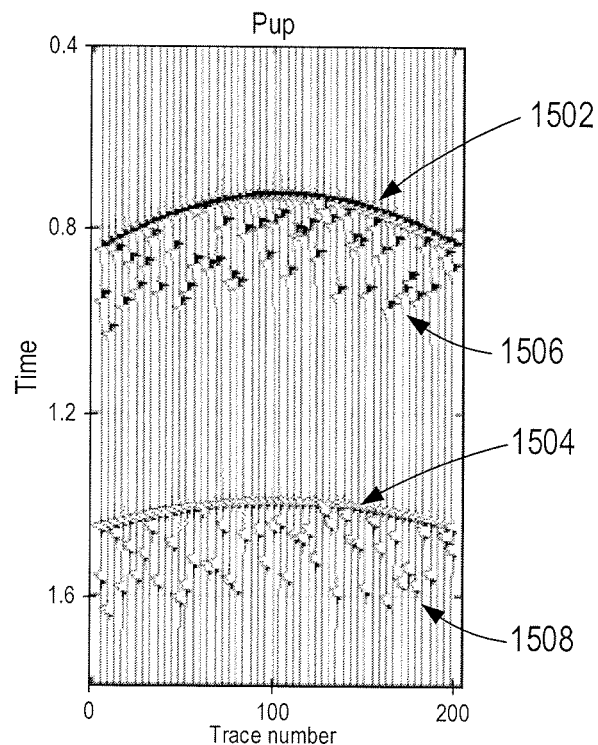
FIGS. 15A-15D show an example of removing a source signature and multiples from simulated pressure wavefield data.
Figure 15B:
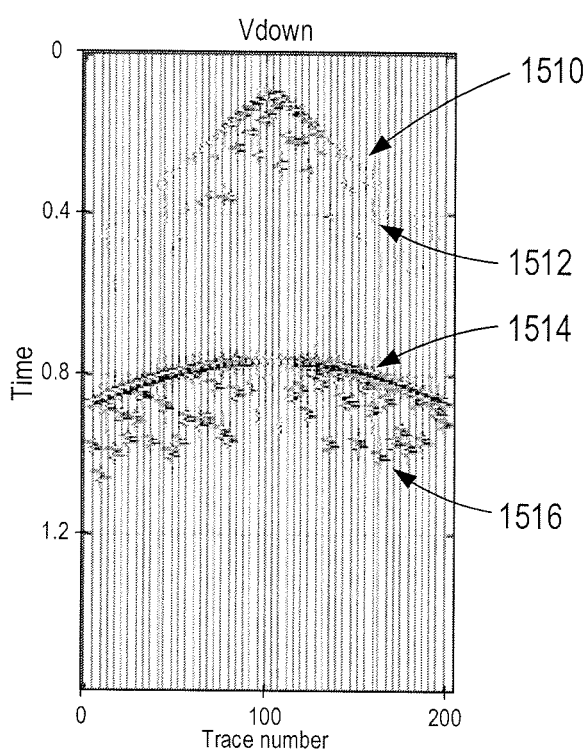
Figure 15C:
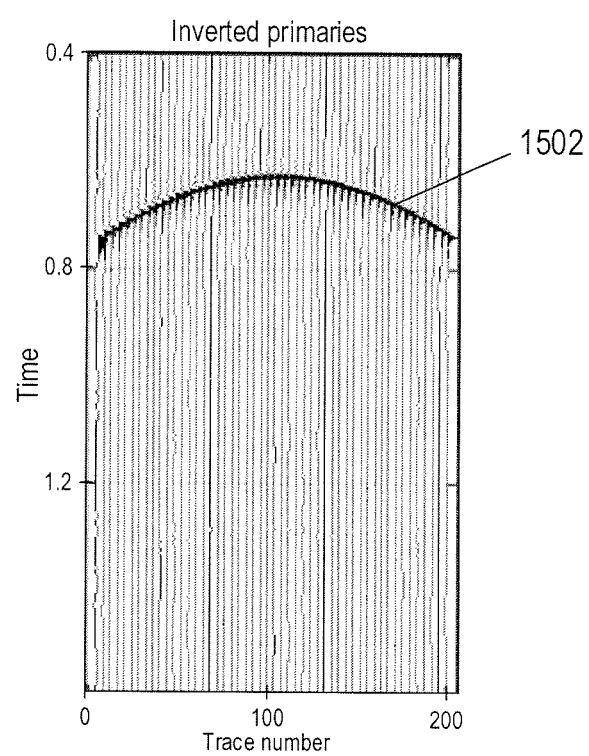
Figure 15D:
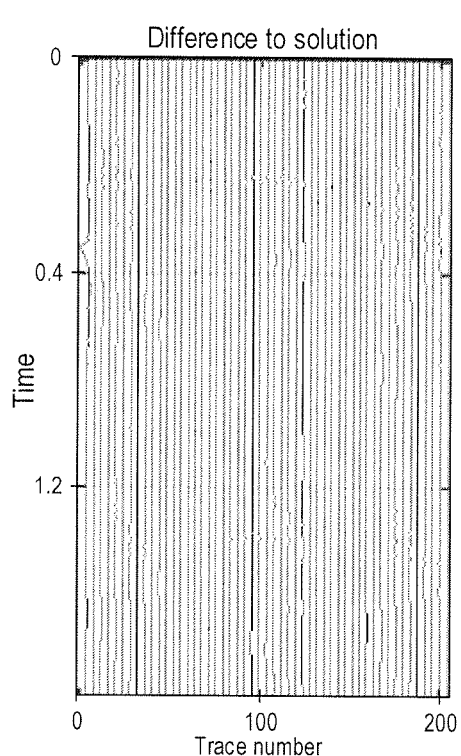

FIGS. 15A-15D show an example of removing a source signature and multiples from simulated pressure wavefield data following system of Equations (20). FIG. 15A shows a gather of synthetic upgoing pressure wavefield data. FIG. 15B shows a gather of synthetic gradient of a downgoing pressure wavefield data. The gathers comprise synthetic upgoing pressure and downgoing vertical velocity wavefields that would be obtained from wavefield separation applied to pressure and vertical velocity wavefields. The gathers were generated for a simulated seismic data acquisition surface comprising 200 receivers located at a depth of 25 meters with receivers separated by 5 meters. The source comprises two source elements positioned at depths of 10 and 15 meters. The simulated subterranean formation comprises a single flat reflector at a depth of 200 meters below a free surface. The gathers were created for a stationary acquisition surface. The sources were moved above one receiver location to a next receiver location in 5-meter increments and fired above each receiver location for two hundred shots in which the first source element was fired every 2 seconds. Firing time of the second source element was randomized between 0 and 0.2 second after firing the first source element. The source signature was a Ricker wavelet with a 60 Hz central frequency. Free surface reflections were simulated and recorded in the gathers for a time-varying rough free surface model generated using a Pierson-Moskowitz spectrum at a wind speed of 15 meters/second, corresponding to a significant wave height of 4.8 meters and a dominant free surface wavelength of 203 meters. The rough free surface model is within the range of realistic weather conditions for acquiring seismic data in a marine survey. In FIG. 15A, reflection event 1502 is a primary reflection and a source ghost created by the first source element. Reflection event 1504 is a first-order free-surface multiple and the corresponding source ghost created by the first source element. FIG. 15A also shows patches of data associated with the second source element, resulting from randomized activation of the second source element after activation of the first element. Patches of reflection events 1506 are a primary refection and a source ghost created by the second source element. Patches of reflection events 1508 are a first-order free-surface multiple and a source ghost created by the second source element. In FIG. 15B, reflection event 1510 is the direct and source ghost of the source wavefield created by the first source element. Patchy reflection event 1512 is the source wavefield created by the second source element. Reflection event 1514 the receiver ghost and source-receiver ghosts created by the first source. Patchy reflection event 1516 is the receiver ghost and source-receiver ghosts created by the second source element. FIGS. 15A and 15B show blending results from the source having two source elements fired at approximately the same time. The two source elements are blended, but every shot is independent. The pressure and gradient wavefields represented in gathers of FIGS. 15A and 15B do not contain blended seismic data. FIG. 15C shows a primary pressure wavefield gather obtained from matrix inversion of system of Equations (20). The source deghosted and multiples present in the pressure wavefield gather of FIG. 15A have been removed, leaving the primary pressure wavefield reflections 1502. The accuracy of the matrix equation in system of Equations (20) is determined by subtracting the primary pressure wavefield gather in FIG. 15A from primary pressure wavefield gather generated using an analytical model. The difference between the primary pressure wavefield gather in FIG. 15C and the result from analytical model is shown in FIG. 15D, demonstrating a close match between the pressure wavefield in FIG. 15C and the primary pressure wavefield gather generated using the analytical model.

Figure 16A:
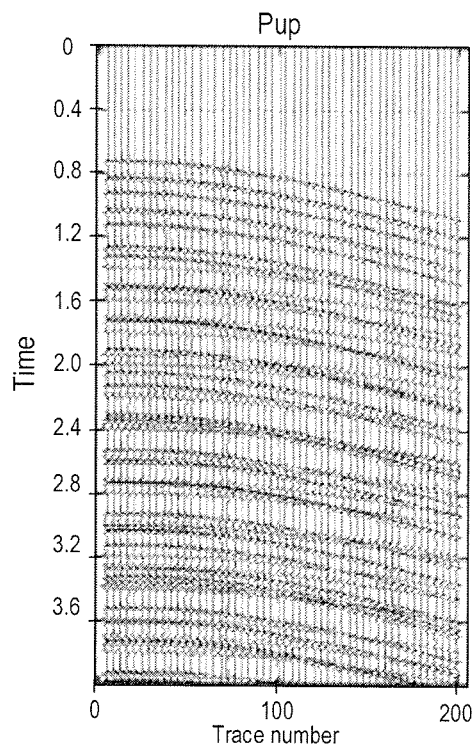
FIGS. 16A-16D show an example of removing source signatures and multiples from simulated blended pressure wavefield data.
Figure 16B:
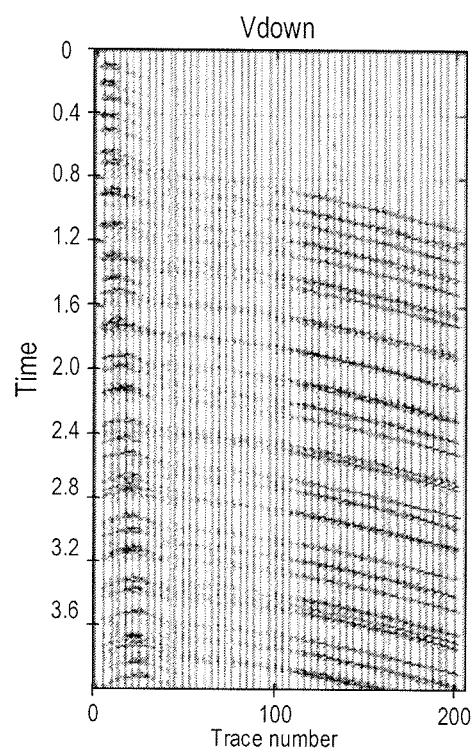
Figure 16C:
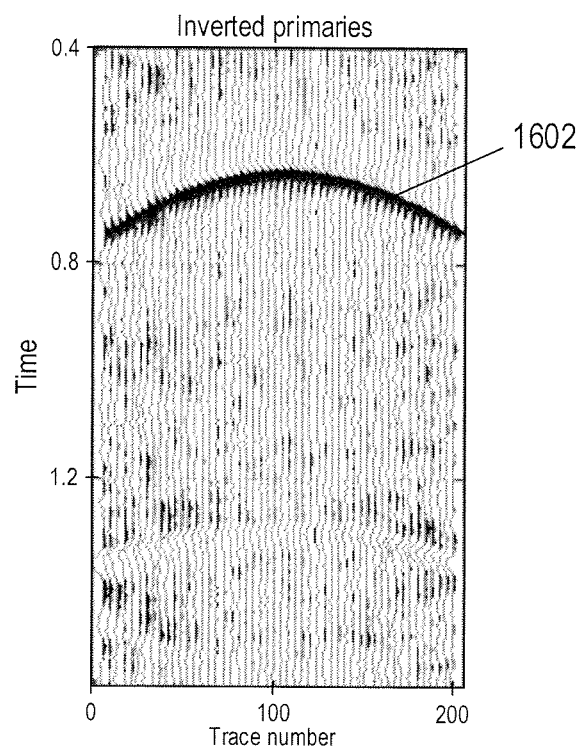
Figure 16D:
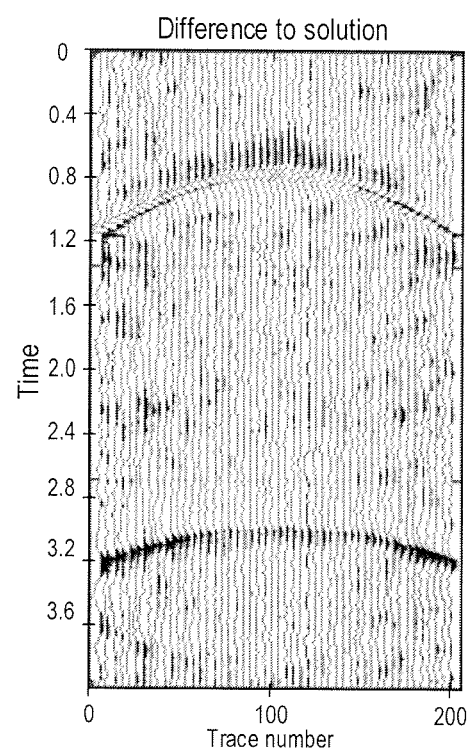

FIGS. 16A and 16B show gathers of blended upgoing pressure and downgoing vertical velocity seismic data obtained using the same seismic data acquisition system, subterranean formation, and source activation times used to create the gathers in FIGS. 15A and 15B. The blended seismic data was obtained by firing the sources so close in time that the separate reflected wavefields cannot be visually resolved in FIGS. 16A and 16B. In this case, we have an ill-posed or underdetermined system of equations. However, unlike the gathers in FIGS. 15A and 15B, the gathers in FIGS. 16A and 16B were continuously recorded together as long shot gathers. The primary reflection 1602 in the gather shown in FIG. 16C was obtained using the matrix equation represented by Equation (25). A difference between the gather shown in FIG. 16C and the primary pressure wavefield gather generated using an analytical model is shown in FIG. 16D. The difference shows close agreement between the gather obtained in FIG. 16C and the analytical model.

It is appreciated that the previous description of the disclosed embodiments is provided to enable any person skilled in the art to make or use the present disclosure. Various modifications to the embodiments will be apparent to those skilled in the art, and the generic principles defined herein may be applied to other embodiments without departing from the spirit or scope of the disclosure. Thus, the present disclosure is not intended to be limited strictly to the embodiments shown herein but is to be accorded the widest scope consistent with the principles and novel features disclosed herein.

The invention claimed is:

1. In a process for generating an image of a subterranean formation located beneath a body of water using marine seismic techniques in which multiple sources are activated in the body of water and receivers located in the body of water record overlapping pressure wavefield and overlapping vertical velocity wavefield from the subterranean formation as blended pressure wavefield and blended vertical velocity wavefield in a data-storage device, the specific improvement comprising:
    computing an upgoing pressure wavefield based on the blended pressure wavefield and the blended vertical velocity wavefield;
    computing a gradient of a downgoing pressure wavefield based on the blended pressure wavefield and the blended vertical velocity wavefield;
    computing a deblended primary pressure wavefield based on the upgoing pressure wavefield and the gradient of the downgoing pressure wavefield; and
    generating an image of the subterranean formation based at least in part on the deblended primary pressure wavefield, thereby enhancing resolution of the image by attenuating source signatures and free-surface effects.

2. The process of claim 1 wherein computing the upgoing pressure wavefield comprises:
    for each receiver location
        computing the upgoing pressure wavefield based on the blended pressure wavefield and the blended vertical velocity wavefield recorded at the receiver location.

3. The process of claim 1 wherein computing the gradient of the downgoing pressure wavefield comprises:
    for each receiver location
        computing a downgoing vertical velocity wavefield based on the blended pressure wavefield and the blended vertical velocity wavefield,
        extrapolating the downgoing vertical velocity wavefield downward from a depth of the receiver location to a point along a separation level between the depth of the receive location and above the subterranean formation, and computing the gradient of the downgoing pressure wavefield at the point on the separation level based on the downgoing vertical velocity wavefield.

4. The process of claim 1 wherein computing the deblended primary pressure wavefield comprises:
for each receiver location
applying time reversal to the gradient of the downgoing pressure wavefield to obtain a time-reversed gradient of the downgoing pressure wavefield,
convolving the time-reversed gradient of the downgoing pressure wavefield with the upgoing pressure wavefield to obtain a cross-correlation wavefield, and
convolving the time-reversed gradient of the downgoing pressure wavefield with the gradient of the downgoing pressure wavefield to obtain a point-spread function of the gradient of the downgoing pressure wavefield;
forming a cross-correlation wavefield matrix from the cross-correlation wavefield at each receiver location;
forming a point-spread function matrix from the point-spread functions at each receiver location; and
computing the deblended primary pressure wavefield based on the cross-correlation wavefield matrix and the point-spread function matrix.

5. A computer system for computing an image of a subterranean formation from recorded blended pressure wavefield and blended vertical velocity wavefield collected in a marine seismic survey of the subterranean formation, the system comprising:
one or more processors;
one or more data-storage devices; and
machine-readable instructions stored in the one or more data-storage devices that when executed using the one or more processors controls the system to perform the operations comprising:
computing a cross-correlation wavefield based on the blended pressure wavefield and the blended vertical velocity wavefield;
computing a point-spread function based on the blended pressure wavefield and the blended vertical velocity wavefield;
computing a deblended primary pressure wavefield based on the cross-correlation wavefield and the point spread function; and
generating an image of the subterranean formation based at least in part on the deblended primary pressure wavefield.

6. The computer system of claim 5 wherein computing the cross-correlation wavefield comprises:
computing an upgoing pressure wavefield based on the blended pressure wavefield and the blended vertical velocity wavefield;
computing a gradient of a downgoing pressure wavefield at a separation level below depths of the receivers based on the blended pressure wavefield and the blended vertical velocity wavefield;
time reversing the gradient of the downgoing pressure wavefield to obtain a time-reversed gradient of the downgoing pressure wavefield; and
convolving the upgoing pressure wavefield with the time-reversed gradient of the downgoing pressure wavefield to obtain the cross-correlation wavefield.

7. The computer system of claim 6 wherein computing the point-spread function comprises:
computing a gradient of a downgoing pressure wavefield at a separation level below depths of the receivers based on the blended pressure wavefield and the blended vertical velocity wavefield;
time reversing the gradient of the downgoing pressure wavefield to obtain a time-reversed gradient of the downgoing pressure wavefield; and
convolving the gradient of the downgoing pressure wavefield with the time-reversed gradient of the downgoing pressure wavefield to obtain the point-spread function.

8. The computer system of claim 6 wherein computing the deblended primary pressure wavefield comprises:
forming a cross-correlation wavefield matrix from the cross-correlation wavefield at each receiver location;
forming a point-spread function matrix from the point-spread functions at each receiver location; and
computing the deblended primary pressure wavefield based on the cross-correlation wavefield matrix and the point-spread function matrix.

9. A non-transitory computer-readable medium encoded with machine-readable instructions that implement a method carried out by one or more processors of a computer system to perform operations comprising:
computing an upgoing pressure wavefield based on pressure wavefield and vertical velocity wavefield recorded in a marine survey of a subterranean formation;
computing a gradient of a downgoing pressure wavefield based on the pressure wavefield and the vertical velocity wavefield;
computing a primary pressure wavefield based on the upgoing pressure wavefield and the gradient of the downgoing pressure wavefield; and
generating an image of the subterranean formation based at least in part on the primary pressure wavefield.

10. The medium of claim 9 wherein computing the upgoing pressure wavefield comprises computing an upgoing vertical velocity wavefield at each receiver location based on the pressure wavefield and the vertical velocity wavefield.

11. The medium of claim 9 wherein computing the gradient of the downgoing pressure wavefield comprises:
computing a downgoing vertical velocity wavefield at each receiver location based on the pressure wavefield and the vertical velocity wavefield;
extrapolating the downgoing vertical velocity wavefield from each receiver location to points along a separation level located between the depth of the receive and the subterranean formation; and
computing the gradient of the downgoing pressure wavefield at the points along the separation level based on the extrapolated downgoing vertical velocity wavefield.

12. The medium of claim 9 wherein computing the primary pressure wavefield comprises:
forming an upgoing pressure wavefield matrix from the upgoing pressure wavefield at each receiver location;
forming a gradient of downgoing pressure wavefield matrix from the gradient of downgoing pressure wavefield at each receiver location; and
computing the primary pressure wavefield at the receiver locations based on the upgoing pressure wavefield matrix and the gradient of downgoing pressure wavefield matrix.

13. Apparatus for generating an image of a subterranean formation from blended pressure wavefield and blended vertical velocity wavefield recorded at receiver locations in a body of water above the subterranean formation, the apparatus comprising:

means for computing a cross-correlation wavefield at each receiver location based on the blended pressure wavefield and the blended vertical velocity wavefield;
means for computing a point-spread function at each receiver location based on the blended pressure wavefield and the blended vertical velocity wavefield;
means for computing a deblended primary pressure wavefield based on the cross-correlation wavefield and the point spread function; and
means for generating an image of the subterranean formation based at least in part on the deblended primary pressure wavefield.

14. The apparatus of claim 13 wherein the means for computing the cross-correlation wavefield comprises:
computes an upgoing pressure wavefield based on the blended pressure wavefield and the blended vertical velocity wavefield;
computes a gradient of a downgoing pressure wavefield at a separation level below depths of the receivers based on the blended pressure wavefield and the blended vertical velocity wavefield;
time reverses the gradient of the downgoing pressure wavefield to obtain a time-reversed gradient of the downgoing pressure wavefield; and
convolves the upgoing pressure wavefield with the time-reversed gradient of the downgoing pressure wavefield to obtain the cross-correlation wavefield.

15. The apparatus of claim 13 wherein the means for computing the point-spread function comprises:
computes a gradient of a downgoing pressure wavefield at a separation level below depths of the receivers based on the blended pressure wavefield and the blended vertical velocity wavefield;
time reverses the gradient of the downgoing pressure wavefield to obtain a time-reversed gradient of the downgoing pressure wavefield; and
convolves the gradient of the downgoing pressure wavefield with the time-reversed gradient of the downgoing pressure wavefield to obtain the point-spread function.

16. The apparatus of claim 13 wherein means for computing the deblended primary pressure wavefield comprises:
forms a cross-correlation wavefield matrix from the cross-correlation wavefield at each receiver location;
forms a point-spread function matrix from the point-spread functions at each receiver location; and
computes the deblended primary pressure wavefield based on the cross-correlation wavefield matrix and the point-spread function matrix.

17. The apparatus of claim 13 wherein the means for computing the cross-correlation wavefield comprises:
computes an upgoing pressure wavefield based on the blended pressure wavefield and the blended vertical velocity wavefield;
computes a gradient of a downgoing pressure wavefield at a separation level below depths of the receivers based on the blended pressure wavefield and the blended vertical velocity wavefield;
time reverses the gradient of the downgoing pressure wavefield to obtain a time-reversed gradient of the downgoing pressure wavefield;
transforms the upgoing pressure wavefield from the space-time domain to the space-frequency domain;
transforms the time-reversed gradient of the downgoing pressure wavefield from the space-time domain to the space-frequency domain; and
multiplies the upgoing pressure wavefield and the time-reversed gradient of the downgoing pressure wavefield to obtain the cross-correlation wavefield.

18. The apparatus of claim 13 wherein the means for computing the point-spread function comprises:
computes a gradient of a downgoing pressure wavefield at a separation level below depths of the receivers based on the blended pressure wavefield and the blended vertical velocity wavefield;
time reverses the gradient of the downgoing pressure wavefield to obtain a time-reversed gradient of the downgoing pressure wavefield;
transforms the upgoing pressure wavefield from the space-time domain to the space-frequency domain;
transforms the time-reversed gradient of the downgoing pressure wavefield from the space-time domain to the space-frequency domain; and
multiplies the gradient of the downgoing pressure wavefield and the time-reversed gradient of the downgoing pressure wavefield to obtain the point-spread function.

19. A method of manufacturing a geophysical data product, the method comprising:
retrieving blended pressure wavefield and blended vertical velocity wavefield from a data-storage device, the blended pressure wavefield and blended vertical velocity wavefield recorded in a marine survey of a subterranean formation;
computing an upgoing pressure wavefield of blended seismic data based on the blended pressure wavefield and the blended vertical velocity wavefield;
computing a downgoing vertical velocity wavefield of blended seismic data based on the blended pressure wavefield and the blended vertical velocity wavefield;
computing a deblended primary pressure wavefield based on the upgoing pressure and downgoing vertical velocity wavefields of blended seismic data;
generating an image of the subterranean formation based at least in part on the deblended primary pressure wavefield; and
storing the image in a non-transitory computer-readable medium.

* * * * *